US011919138B2

(12) United States Patent
Nakashima

(10) Patent No.: US 11,919,138 B2
(45) Date of Patent: Mar. 5, 2024

(54) IMPACT TOOL

(71) Applicant: MAKITA CORPORATION, Anjo (JP)

(72) Inventor: Tatsuo Nakashima, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/938,053

(22) Filed: Oct. 5, 2022

(65) Prior Publication Data

US 2023/0121902 A1 Apr. 20, 2023

(30) Foreign Application Priority Data

Oct. 19, 2021 (JP) ................................ 2021-171211
Oct. 19, 2021 (JP) ................................ 2021-171212

(51) Int. Cl.
*B25F 5/00* (2006.01)
*B25B 21/02* (2006.01)
(Continued)

(52) U.S. Cl.
CPC .............. *B25F 5/006* (2013.01); *B25B 21/02* (2013.01); *B25D 17/06* (2013.01); *B25F 5/02* (2013.01); *B25D 2217/0015* (2013.01)

(58) Field of Classification Search
CPC . B25F 5/006; B25F 5/02; B25B 21/02; B25D 17/06; B25D 2217/0015
See application file for complete search history.

(56) References Cited

U.S. PATENT DOCUMENTS 4,401,167 A * 8/1983 Sekizawa ............. B25D 17/043 248/573
4,667,749 A * 5/1987 Keller ..................... B25F 5/006 267/140.13

(Continued)

FOREIGN PATENT DOCUMENTS

JP 6696572 B2 5/2020
JP 6801571 B2 12/2020

OTHER PUBLICATIONS

Unpublished U.S. Appl. No. 17/938,054.
Notice of Allowance dated Jun. 6, 2023, in related U.S. Appl. No. 17/938,054, and allowed claims 1-20.

*Primary Examiner* — Anna K Kinsaul
*Assistant Examiner* — Lucas E. A. Palmer
(74) *Attorney, Agent, or Firm* — J-TEK LAW PLLC; Jeffrey D. Tekanic; Scott T. Wakeman

(57) ABSTRACT

An impact tool (1) includes: a motor (10); an impact mechanism (15), which is rotatable about an output rotational axis (BX) and is driven by the motor; an anvil (16) having an anvil shaft (113) disposed forward of the impact mechanism; and at least one anvil projection (114) protruding radially outward from a rear-end portion of the anvil shaft and configured to be impacted by the impact mechanism in a rotational direction; a hammer case (6) housing the impact mechanism; a main-body housing (2) disposed rearward of, and fixed to, the hammer case; a grip housing (3) having at least a portion disposed rearward of the main-body housing, the grip housing being coupled to the main-body housing so as to be movable relative to the main-body housing; and at least one vibration-isolating member (138, 139) disposed between the main-body housing and the grip housing.

20 Claims, 18 Drawing Sheets

(51) Int. Cl.
*B25D 17/06* (2006.01)
*B25F 5/02* (2006.01)

(56) References Cited

U.S. PATENT DOCUMENTS 4,749,049 A * 6/1988 Greppmair .............. F16F 15/08 173/162.2
5,681,214 A * 10/1997 Kleider .................... B28D 1/04 451/344
5,692,574 A * 12/1997 Terada ................. B25D 17/043 173/162.2
6,026,910 A * 2/2000 Masterson .............. B25F 5/006 267/141.1
6,912,790 B2 * 7/2005 James .................... B23D 51/01 30/392
7,052,382 B2 * 5/2006 Baker .................... B23Q 5/045 451/344
7,517,276 B2 * 4/2009 Kuragano ............... B25F 5/006 451/451
7,523,790 B2 * 4/2009 Arakawa .............. B25D 17/043 173/162.1
7,762,348 B2 * 7/2010 Stirm ................... B25D 17/043 173/162.1
D623,909 S * 9/2010 Tate .................................. D8/8
7,866,048 B2 * 1/2011 Kodama ................ A01G 3/053 16/110.1
7,886,838 B2 * 2/2011 Hahn ................... B25D 17/043 16/110.1
8,156,656 B2 * 4/2012 Tate ....................... A01G 3/053 16/110.1
8,240,395 B2 * 8/2012 Kamegai ................ B25D 17/04 173/162.1
8,690,497 B2 * 4/2014 Bodine ................. B23B 45/001 408/124
8,708,062 B2 * 4/2014 Lamprecht ................ B25F 5/02 173/217
8,966,773 B2 * 3/2015 Gregorich ............... B25F 5/006 30/392
9,168,649 B2 * 10/2015 Harcar ................. B25D 17/043
9,868,200 B2 * 1/2018 Lutz ....................... B23Q 17/00
9,950,418 B2 4/2018 Kakiuchi et al.
9,993,915 B2 * 6/2018 Roberts ................ B25D 17/043
9,999,967 B2 6/2018 Furusawa et al.
10,137,562 B2 * 11/2018 Roberts .................. B25D 16/00
10,654,158 B2 * 5/2020 Fischer ................... B25F 5/006
10,780,564 B2 9/2020 Iida et al.
11,148,272 B2 10/2021 Yoshikane et al.
2004/0148789 A1 * 8/2004 Gist .......................... B25F 5/02 30/392
2005/0028996 A1 * 2/2005 Toukairin ............... B25D 17/24 173/176
2006/0113098 A1 * 6/2006 Inagawa ............... B24B 23/028 173/162.2
2006/0166613 A1 * 7/2006 Lamprecht ............. B25F 5/006 451/359
2006/0185867 A1 * 8/2006 Frauhammer ........ B25D 17/043 173/162.1
2006/0225906 A1 * 10/2006 Chen ....................... B25F 5/006 173/210
2006/0258274 A1 * 11/2006 Oki ......................... B25F 5/006 451/358
2007/0034397 A1 * 2/2007 Fischer ................ B25D 17/043 173/162.2
2007/0289762 A1 * 12/2007 Kikukchi ............ B25D 17/043 173/162.1
2008/0047724 A1 * 2/2008 Fischer ................ B25D 17/043 173/162.2
2008/0277128 A1 * 11/2008 Satou ...................... B25F 5/006 173/48
2010/0071923 A1 3/2010 Rudolph et al.
2012/0160533 A1 * 6/2012 Kamegai ................ B25D 17/20 173/162.2
2014/0318821 A1 * 10/2014 Wyler ..................... B25F 5/006 173/104
2015/0202764 A1 * 7/2015 Roberts .................. B25D 17/24 173/162.2
2015/0328760 A1 * 11/2015 Ikuta .................... B25D 17/043 173/117
2016/0136801 A1 * 5/2016 Furusawa ............... B25F 5/026 173/162.2
2017/0028537 A1 2/2017 McClung et al.
2017/0144290 A1 5/2017 Tsutsui et al.
2017/0151657 A1 6/2017 Nagasaka et al.
2018/0099399 A1 * 4/2018 Sunabe ..................... B25F 5/02
2019/0030696 A1 1/2019 Seith et al.
2019/0247985 A1 8/2019 Xu et al.
2019/0358769 A1 * 11/2019 Miyazawa .............. B24B 47/12
2019/0358789 A1 11/2019 Chung et al.
2019/0381646 A1 * 12/2019 Yoshikane ................ B25F 5/02
2020/0023501 A1 1/2020 Bandy et al.
2020/0171632 A1 6/2020 Dey, IV et al.
2020/0215668 A1 7/2020 Duncan et al.
2021/0060755 A1 3/2021 Kawai
2021/0107128 A1 4/2021 Lu et al.
2021/0129307 A1 * 5/2021 Tsuji ...................... B25D 17/04
2021/0162525 A1 6/2021 Yonosuke
2021/0162526 A1 6/2021 Yonosuke
2021/0197290 A1 7/2021 Yonosuke
2021/0237249 A1 * 8/2021 Fischer ...................... B25F 5/02
2022/0040829 A1 2/2022 Schneider et al.
2023/0041828 A1 * 2/2023 Takahashi .............. A01G 3/053
2023/0117577 A1 * 4/2023 Nakashima ........... B25B 21/026 173/117

* cited by examiner

9/18

IMPACT TOOL

CROSS-REFERENCE

This application claims priority to Japanese Patent Application No. 2021-171211 filed on Oct. 19, 2021, and to Japanese Patent Application No. 2021-171212 filed on Oct. 19, 2021, the contents of both of which are incorporated herein by reference.

TECHNICAL FIELD

The techniques disclosed in the present specification relate to an impact tool.

BACKGROUND ART

US 2019/0358769 discloses a power tool, namely a disc grinder, that comprises a grip housing (handle housing) configured to be is gripped by a user. This disc grinder comprises vibration-isolating members, which are interposed between a motor housing and a handle housing and serve to attenuate vibration transmitted to the handle housing.

SUMMARY OF THE INVENTION

Impact tools, such as impact wrenches and impact drivers, are known examples of power tools that generate significant vibration during operation. An impact tool comprises an anvil and an impact mechanism, which impacts the anvil in a rotational direction. When the impact mechanism impacts (strikes) the anvil, a relatively large vibration is generated. Therefore, for such impact tools, there is demand for a technique to attenuate vibration that is transmitted to the grip housing.

One non-limiting of the present teachings is to disclose techniques for attenuating vibration that would otherwise be transmitted to a grip housing.

In one non-limiting aspect of the present teachings, an impact tool may comprise: a motor; an impact mechanism (e.g., a hammer), which is driven by the motor; an anvil, which is impacted (struck) by the impact mechanism in a rotational direction; a hammer case, which houses the impact mechanism; a main-body housing; and a grip housing. The impact mechanism may be rotatable about an output rotational axis extending in a front-rear direction. The anvil may comprise: an anvil-shaft part (anvil shaft), which is disposed forward of the impact mechanism; and one or more anvil-projection parts (anvil projection(s) or lug(s)), which protrude(s) radially outward from a rear-end portion of the anvil-shaft part. The anvil-projection part(s) may be impacted by the impact mechanism in the rotational direction about the output rotational axis. The main-body housing may be disposed rearward of the hammer case. The main-body housing may be fixed to the hammer case. At least a portion of the grip housing may be disposed rearward of the main-body housing. The grip housing may be coupled to the main-body housing in a movable manner relative to the main-body housing. The impact tool may comprise one or more vibration-isolating members, which is (are) disposed between the main-body housing and the grip housing.

According to one or more of the techniques disclosed in the present specification, it is possible to reduce the amount of vibration that is transmitted to a grip housing of an impact tool.

DETAILED DESCRIPTION

Figure 1:
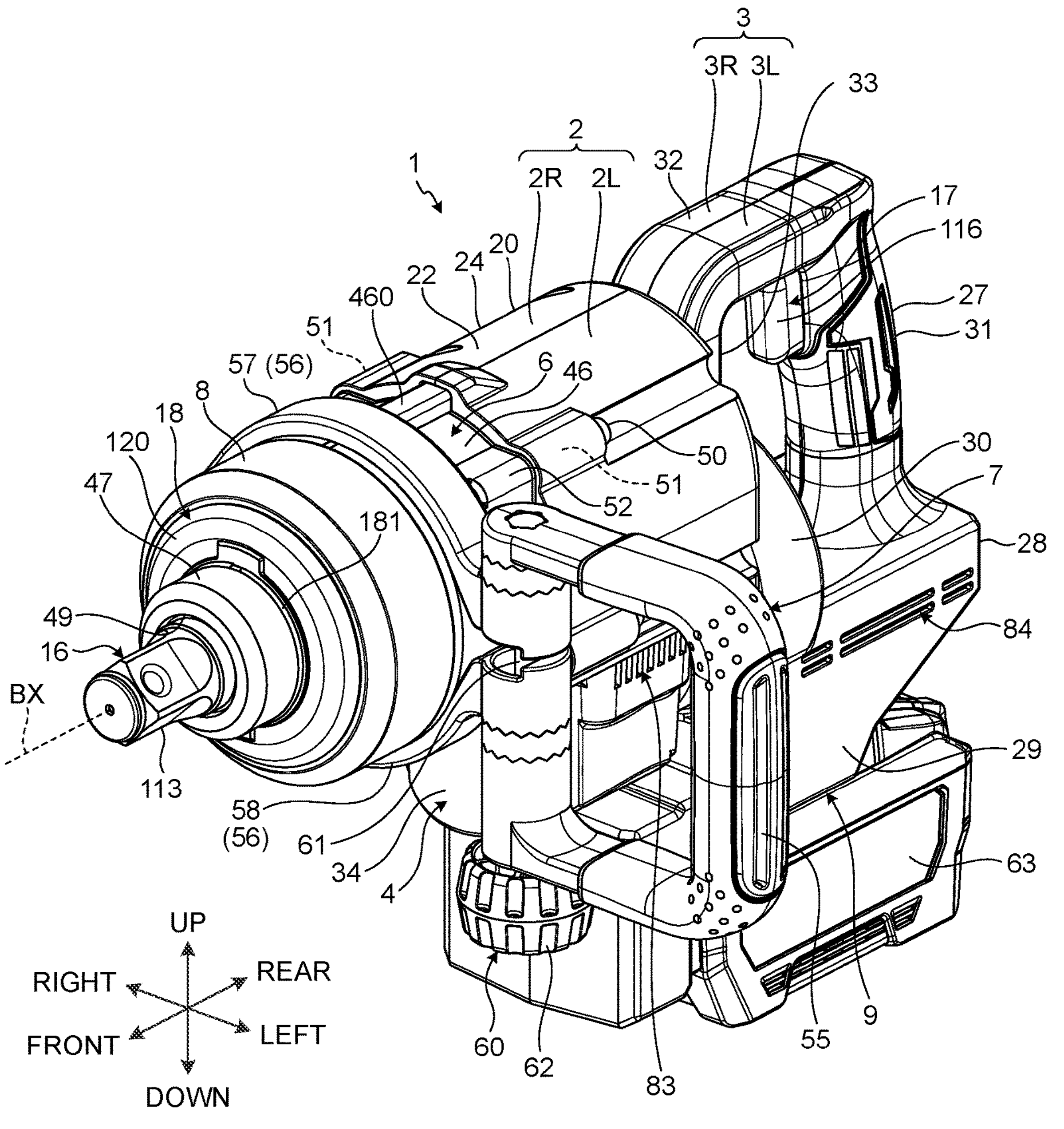
FIG. 1 is an oblique view, viewed from the front left, that shows an impact tool according to one non-limiting embodiment of the present teachings.

As was noted above, an impact tool may comprise: a motor; an impact mechanism, which is driven by the motor; an anvil, which is impacted by the impact mechanism in a rotational direction; a hammer case, which houses the impact mechanism; a main-body housing; and a grip housing. The impact mechanism may be rotatable about an output rotational axis extending in a front-rear direction. The anvil may comprise: an anvil-shaft part (anvil shaft), which is disposed forward of the impact mechanism; and one or more anvil-projection parts (anvil projection(s)), which protrude(s) radially outward from a rear-end portion of the anvil-shaft part. The anvil-projection part(s) may be impacted by the impact mechanism in the rotational direction about the output rotational axis. The main-body housing may be disposed rearward of the hammer case. The main-body housing may be fixed to the hammer case. At least a portion of the grip housing may be disposed rearward of the main-body housing. The grip housing may be coupled to the main-body housing in a movable manner relative to the main-body housing. The impact tool may comprise one or more vibration-isolating member(s), which is (are) disposed between the main-body housing and the grip housing.

According to the above-mentioned configuration, the grip housing is coupled to the main-body housing so as to be movable relative to the main-body housing. The vibration-isolating member(s) is (are) disposed between the main-body housing and the grip housing. When the impact mechanism impacts the anvil in the rotational direction, a relatively large vibration is generated in the hammer case. When vibration has been generated in the hammer case, the vibration-isolating member(s) attenuate(s) (absorb(s)) such vibration so that less vibration is transmitted from the hammer case to the grip housing via the main-body housing.

In one or more embodiments, the main-body housing may comprise a main-body part and a protruding part, which protrudes rearward from the main-body part. The grip housing may comprise a coupling part, which is coupled to the protruding part. The vibration-isolating member(s) may be disposed between the protruding part and the coupling part.

According to the above-mentioned configuration, by disposing the vibration-isolating member(s) between the protruding part of the main-body housing and the coupling part of the grip housing, the vibration-isolating member(s) and the impact tool can be designed in a space-minimizing manner.

In one or more embodiments, the vibration-isolating member(s) may comprise one or more first vibration-isolating member(s), which attenuate(s) or reduce(s) the transmission of vibration from the hammer case to the grip housing in an axial direction that is parallel to the output rotational axis.

According to the above-mentioned configuration, when, for example, a load in the axial direction acts on the anvil during a fastening operation and therefore vibration in the axial direction is being generated in the hammer case, the first vibration-isolating member(s) can attenuate (absorb) vibration that would otherwise be transmitted from the hammer case to the grip housing via the main-body housing.

In one or more embodiments, the first vibration-isolating member(s) may be composed of rubber.

According to the above-mentioned configuration, transmission of vibration of the hammer case in the axial direction to the grip housing is attenuated (absorbed) by elastic deformation of the rubber. In addition, rattling between the protruding part and the coupling part can be reduced.

In one or more embodiments, the protruding part may have: an outer-circumferential surface, which is disposed such that it encircles a virtual axis parallel to the output rotational axis; and a groove part, which is formed on at least a portion of the outer-circumferential surface and in which a protruding part (protrusion) provided on the grip housing is disposed. An inner surface of the groove part may include: a first support surface, which faces rearward; and a second support surface, which is disposed rearward of the first support surface and faces forward. The first vibration-isolating member(s) may (each) comprise a first vibration-isolating portion, which is supported by the first support surface, and a second vibration-isolating portion, which is supported by the second support surface. The protruding part may be disposed between the first vibration-isolating portion and the second vibration-isolating portion.

According to the above-mentioned configuration, because the protruding part (protrusion) of the grip housing is sandwiched between the first vibration-isolating portion and the second vibration-isolating portion in the axial direction, vibration that would otherwise be transmitted from the hammer case to the grip housing in the axial direction is attenuated by elastic deformation of the first vibration-isolating portion and elastic deformation of the second vibration-isolating portion in the axial direction.

In one or more embodiments, the first vibration-isolating member(s) may (each) comprise a third vibration-isolating portion, which is connected to the first vibration-isolating portion and the second vibration-isolating portion.

According to the above-mentioned configuration, because the first vibration-isolating portion and the second vibration-isolating portion are integrated via the third vibration-isolating portion, work efficiency during assembly when disposing the first vibration-isolating member in the groove part can be improved.

In one or more embodiments, the vibration-isolating member(s) may comprise one or more second vibration-isolating member(s), which attenuate(s) or absorb(s) vibration from the hammer case that propagates in the rotational direction about the output rotational axis and would otherwise be transmitted to the grip housing.

According to the above-mentioned configuration, when, for example, the impact mechanism impacts the anvil in the rotational direction during a fastening operation and therefore vibration in the rotational direction is being generated in the hammer case, the second vibration-isolating member(s) can attenuate or absorb vibration that would otherwise be transmitted from the hammer case to the grip housing via the main-body housing.

In one or more embodiments, the protruding part may have: an outer-circumferential surface, which is disposed such that it encircles a virtual axis parallel to the output rotational axis; a groove part, which is formed on at least a portion of the outer-circumferential surface and in which a protruding part provided on the grip housing is disposed; and a recessed part (recess), which is formed (defined) on the outer-circumferential surface adjacent to the groove part. The second vibration-isolating member may be disposed in the recessed part. At least a portion of the protruding part may make contact with an end portion of the second vibration-isolating member(s).

According to the above-mentioned configuration, because the end portion of the protruding part of the grip housing in the rotational direction makes contact with the end portion of the second vibration-isolating member(s) in the rotational direction, vibration of the hammer case in the rotational direction that would otherwise be transmitted to the grip housing is attenuated.

In one or more embodiments, a plurality of the groove parts may be provided on the outer-circumferential surface. A plurality of the protruding parts may be provided and the protruding parts are respectively disposed in the plurality of the groove parts. The recessed part may be formed between a first groove part and a second groove part. A first protruding part, which is disposed within the first groove part, may make contact with one end portion of the second vibration-isolating member(s). A second protruding part, which is disposed within the second groove part, may make contact with the other end portion of the second vibration-isolating member(s).

According to the above-mentioned configuration, the second vibration-isolating member(s) is (are) disposed such that it is (they are) sandwiched between the first protruding part and the second protruding part in the rotational direction. Thereby, vibration between the first protruding part and the second protruding part is attenuated by at least one of the second vibration-isolating member(s). Consequently, even if the number of the second vibration-isolating members is minimized, transmission of vibration from the hammer case in the rotational direction to the grip housing can be reduced.

In one or more embodiments, the second vibration-isolating member(s) may (each) comprise a spring.

According to the above-mentioned configuration, transmission of vibration of the hammer case in the rotational direction to the grip housing is reduced by elastic deformation of the spring. In addition, rattling between the protruding part and the coupling part can be reduced.

In one or more embodiments, the impact tool may comprise: a speed-reducing mechanism, which is configured to transmit rotational force of the motor to the impact mechanism; and a gear case, which houses at least a portion of the speed-reducing mechanism and is fixed to the hammer case. The main-body housing may house the gear case.

According to the above-mentioned configuration, the main-body housing is fixed to the hammer case and can house the gear case, which is fixed to the hammer case.

In one or more embodiments, the impact tool may comprise: a motor housing, which is disposed downward of the gear case and houses the motor. The motor housing may be connected to the main-body housing.

According to the above-mentioned configuration, the main-body housing is fixed to the hammer case and can be connected to the motor housing, which houses the motor.

In one or more embodiments, the motor housing may be fixed to the gear case.

According to the above-mentioned configuration, the hammer case, the gear case, and the motor housing are integrated.

In one or more embodiments, the motor may comprise a stator, a rotor, which is rotatable relative to the stator about a motor rotational axis extending in an up-down direction, and a rotor shaft, which is fixed to the rotor.

According to the above-mentioned configuration, the motor rotational axis and the output rotational axis are orthogonal to each other. When the motor is started or stopped, transmission of vibration in the rotational direction about the motor rotational axis generated in the motor to the grip housing is attenuated.

In one or more embodiments, the impact tool may comprise: a first bevel gear, which is fixed to an upper-end portion of the rotor shaft. The speed-reducing mechanism may comprise a second bevel gear, which meshes with the first bevel gear, and a planetary-gear mechanism, which is driven based on the rotational force of the motor transmitted via the second bevel gear.

According to the above-mentioned configuration, even though the motor rotational axis and the output rotational axis are orthogonal to each other, the rotational force of the motor is transmitted to the planetary-gear mechanism of the speed-reducing mechanism by the first bevel gear and the second bevel gear.

In one or more embodiments, the grip housing may comprise a grip part. The impact tool may comprise a trigger switch, which is disposed on the grip part and is manipulated to operate the motor.

According to the above-mentioned configuration, in the state in which the user has gripped the grip part with, for example, their right hand, the trigger switch can be manipulated using a finger of their right hand, and thereby the motor can be caused to operate.

In one or more embodiments, the impact tool may comprise a controller, which controls the motor. The grip housing may comprise a controller-housing part, which houses the controller.

According to the above-mentioned configuration, the controller is disposed in the grip housing. The transmission of vibration of the hammer case to the controller via the main-body housing is attenuated by the vibration-isolating member(s). If an excessive amount of vibration were to be (hypothetically) transmitted to the controller, there is a possibility that, for example, a controller malfunction will occur. Because the transmission of vibration to the controller is attenuated, the likelihood of malfunctions of the controller is reduced.

In one or more embodiments, the grip part may comprise: a rear-grip part, which extends upward from a rear portion of the controller-housing part; an upper-grip part, which extends forward from an upper-end portion of the rear-grip part; and a front-grip part, which extends downward from a front-end portion of the upper-grip part.

According to the above-mentioned configuration, the grip part is formed substantially in a ring shape. Thereby, even if the impact energy of the impact mechanism (the fastening torque of the anvil) is increased, the user can handle the impact energy of the impact mechanism by gripping at least a portion of the grip part.

Embodiments according to the present disclosure are explained below, with reference to the drawings, but the present disclosure is not limited to the embodiments. Structural elements of the embodiments explained below can be combined where appropriate. In addition, there are also situations in which some of the structural elements are not used.

In the embodiments, positional relationships among parts are explained using the terms "left," "right," "front," "rear," "up," and "down." These terms indicate relative positions or directions, with the center of an impact tool 1 as the reference. A left-right direction, a front-rear direction, and an up-down direction are all mutually orthogonal.

Impact Tool

Figure 2:
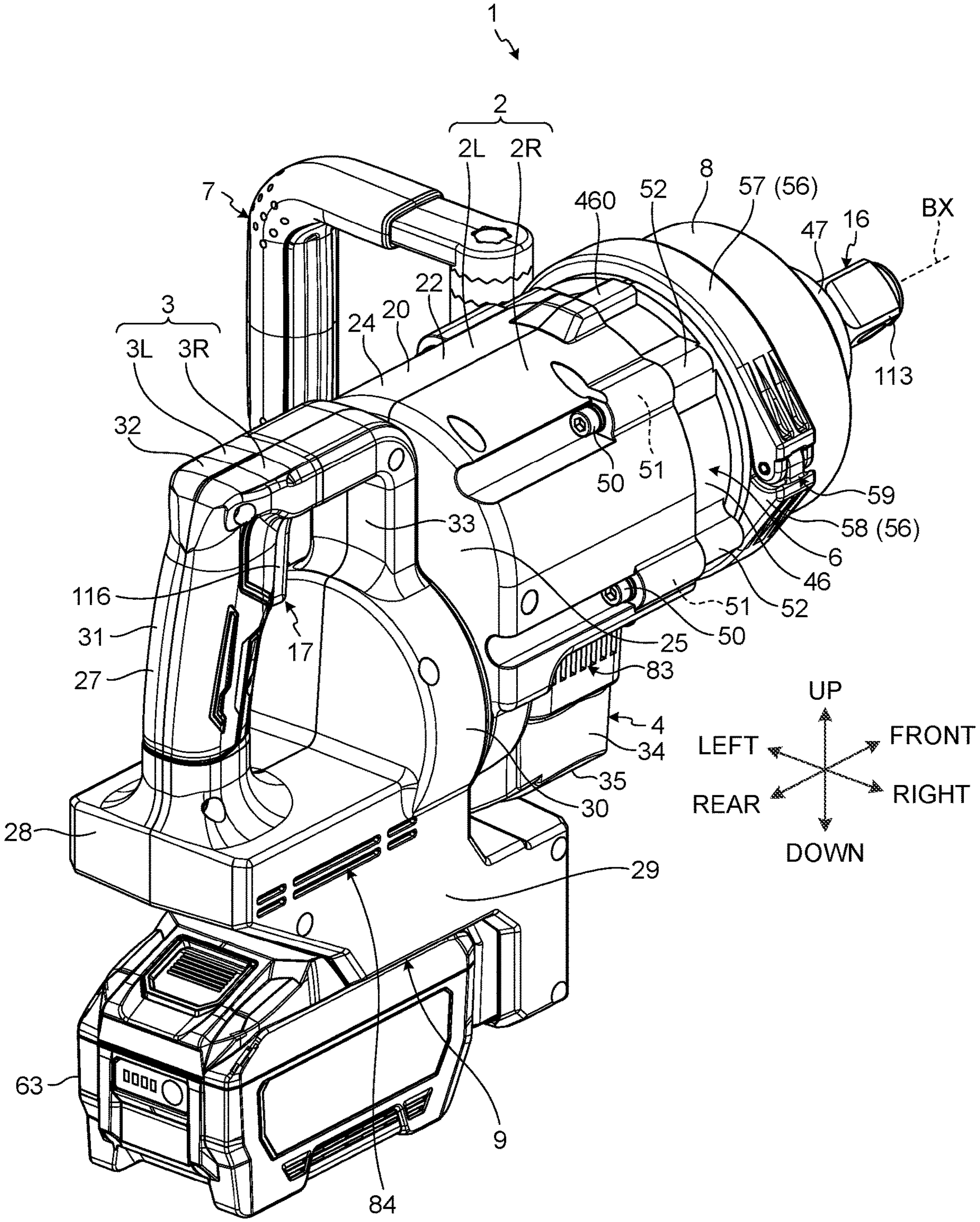
FIG. 2 is an oblique view, viewed from the rear right, that shows the impact tool according to the embodiment.
Figure 3:
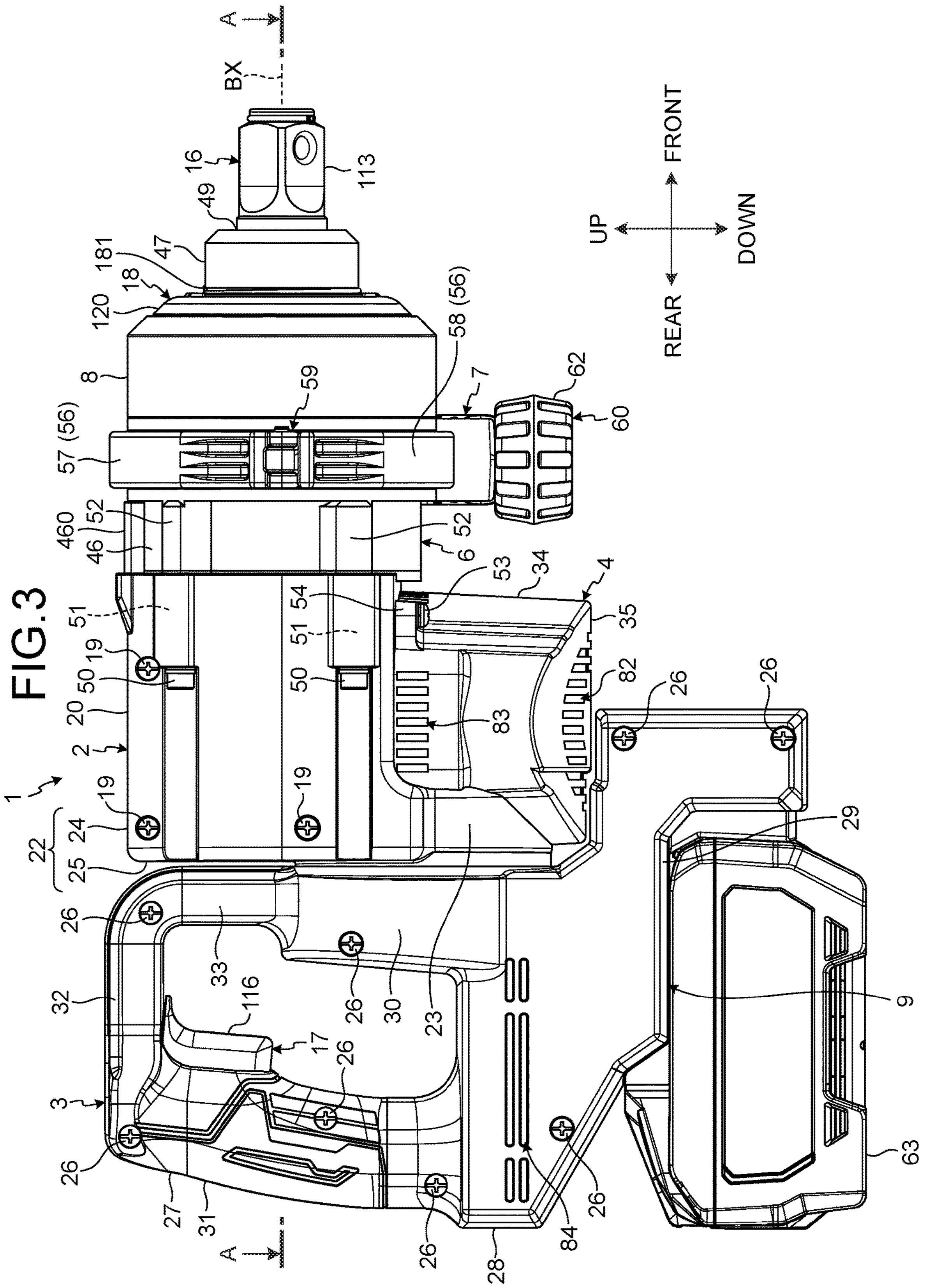
FIG. 3 is a drawing, viewed from the right, of the impact tool according to the embodiment.
Figure 4:
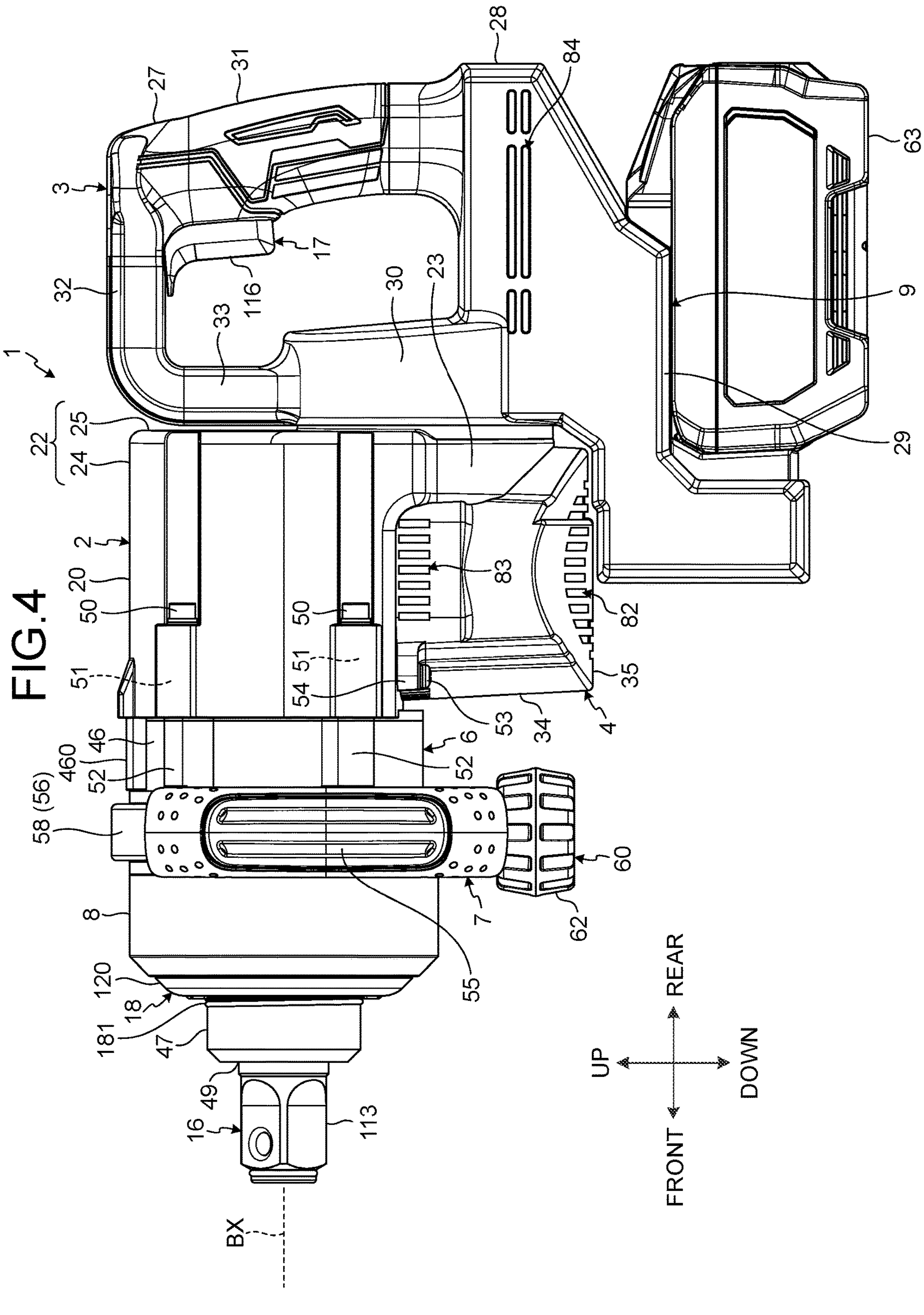
FIG. 4 is a drawing, viewed from the left, of the impact tool according to the embodiment.
Figure 5:
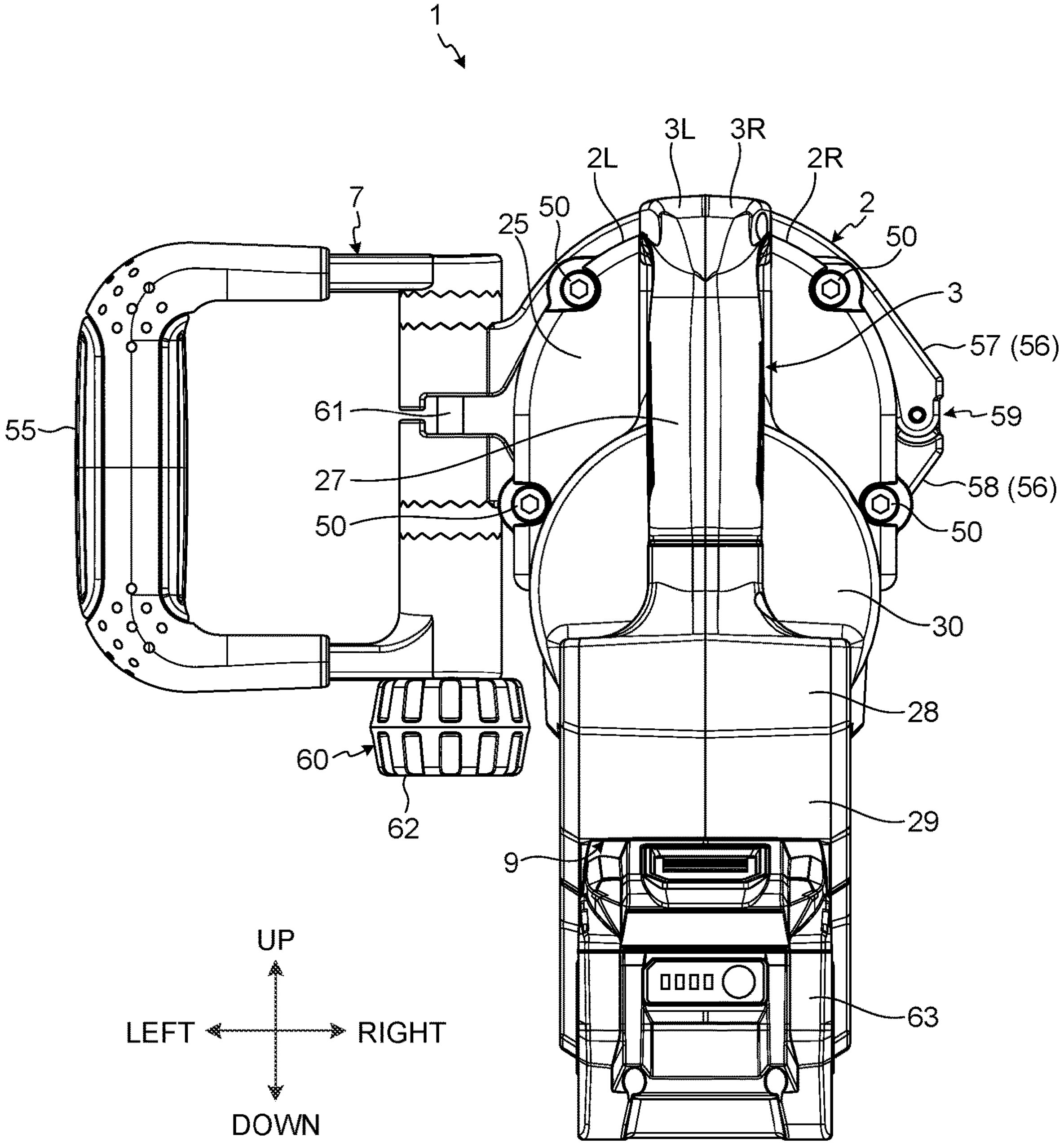
FIG. 5 is a drawing, viewed from the rear, of the impact tool according to the embodiment.
Figure 6:
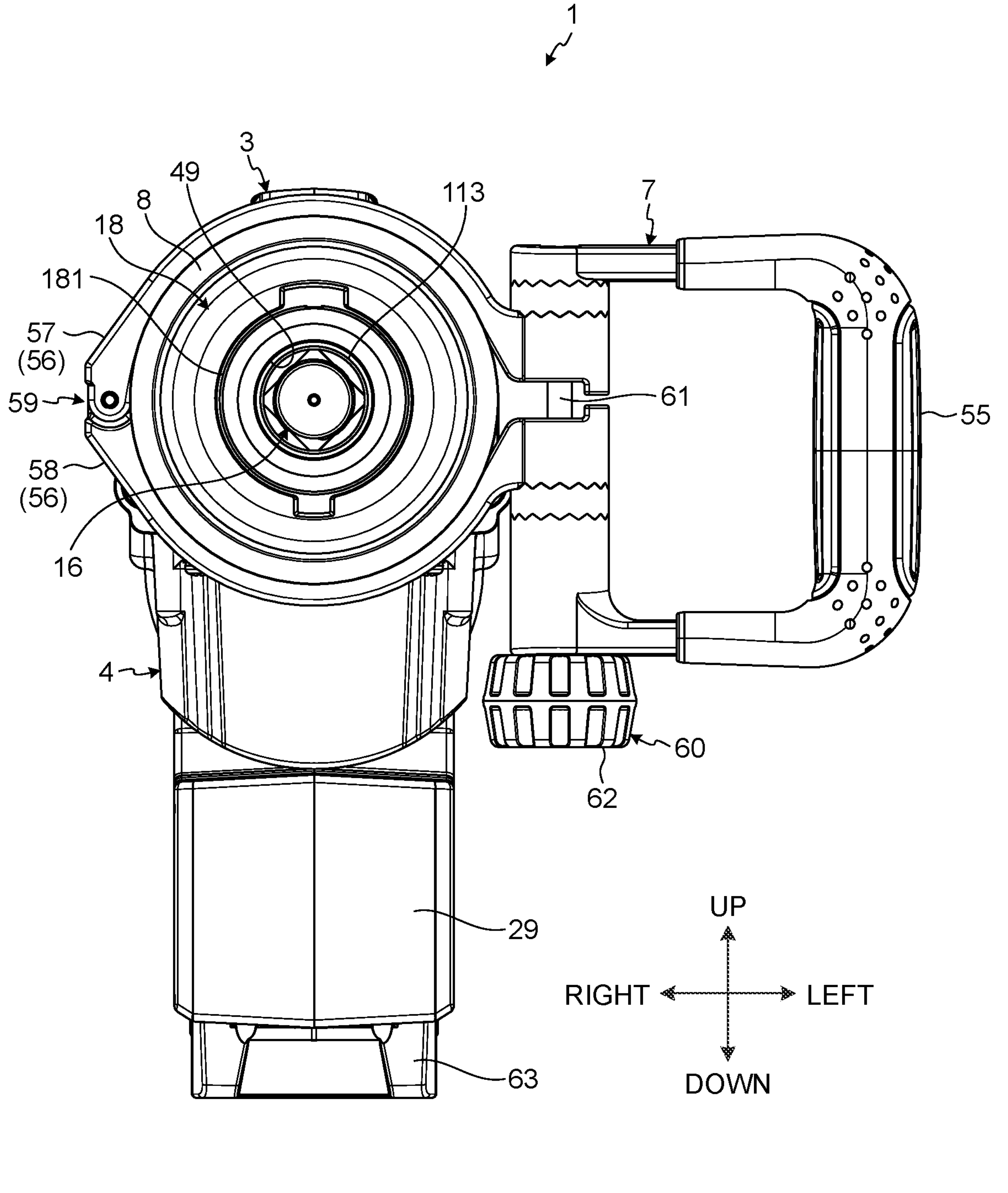
FIG. 6 is a drawing, viewed from the front, of the impact tool according to the embodiment.
Figure 7:
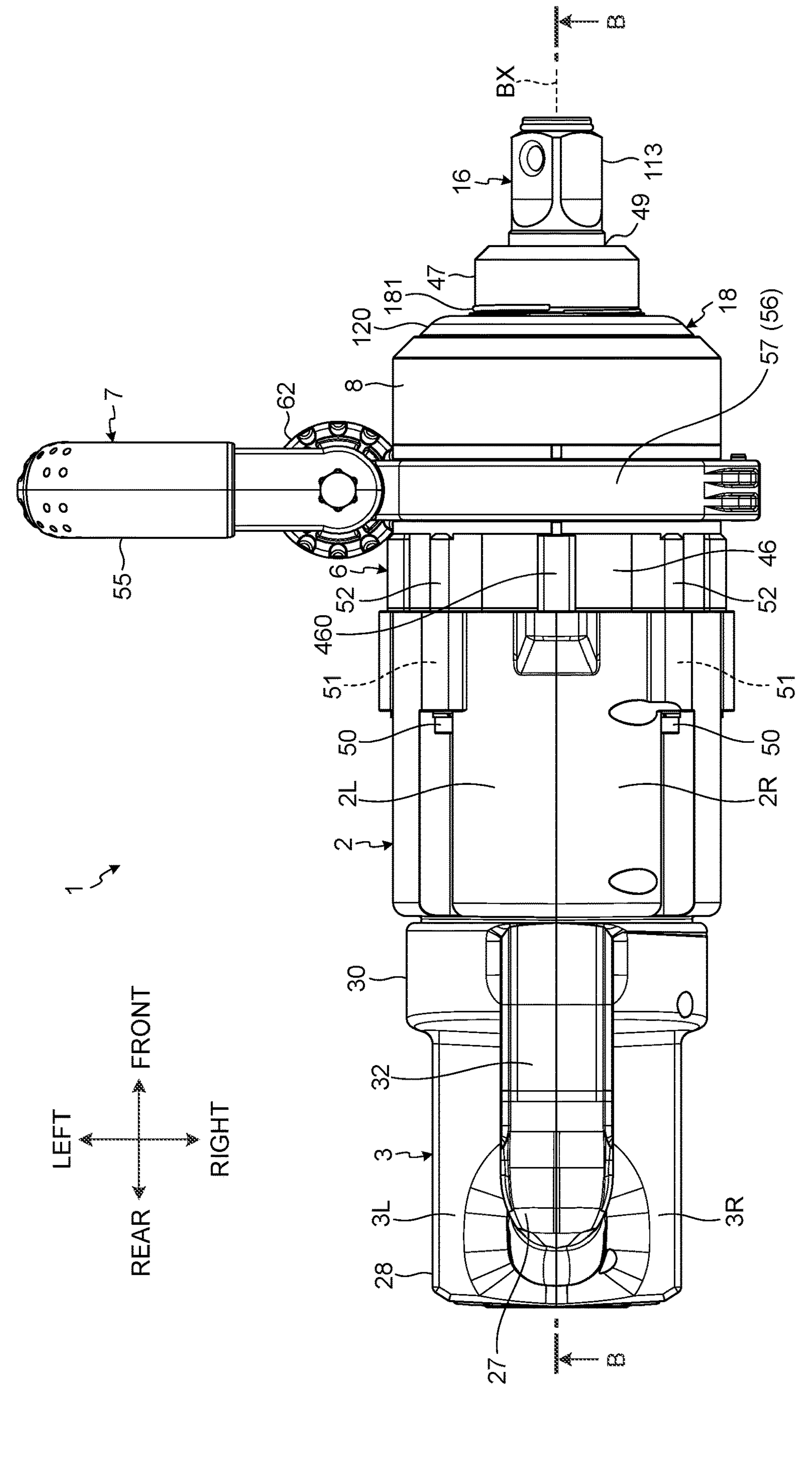
FIG. 7 is a drawing, viewed from above, of the impact tool according to the embodiment.
Figure 8:
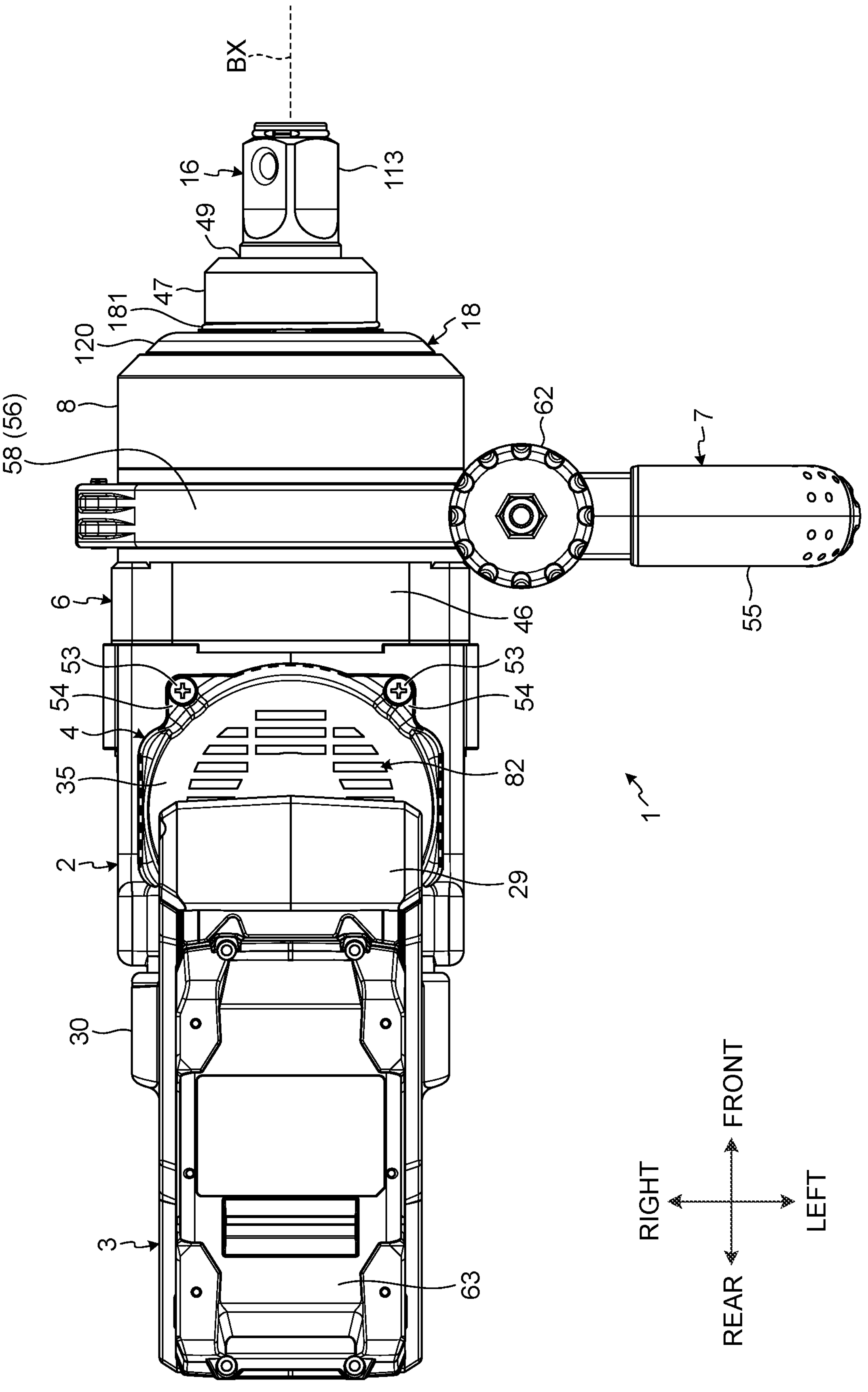
FIG. 8 is a drawing, viewed from below, of the impact tool according to the embodiment.
Figure 9:
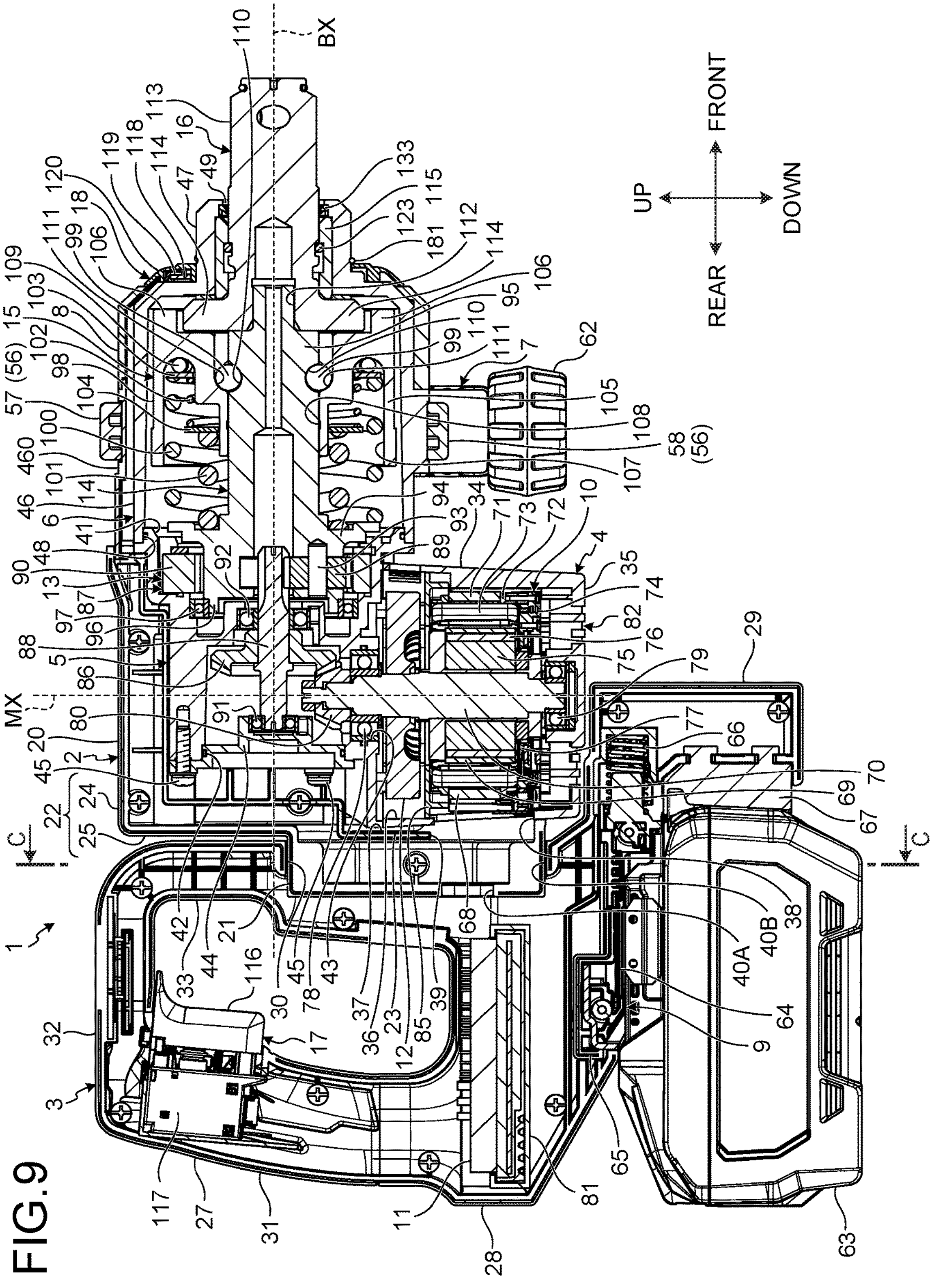
FIG. 9 is a cross-sectional view that shows the impact tool according to the embodiment.
Figure 10:
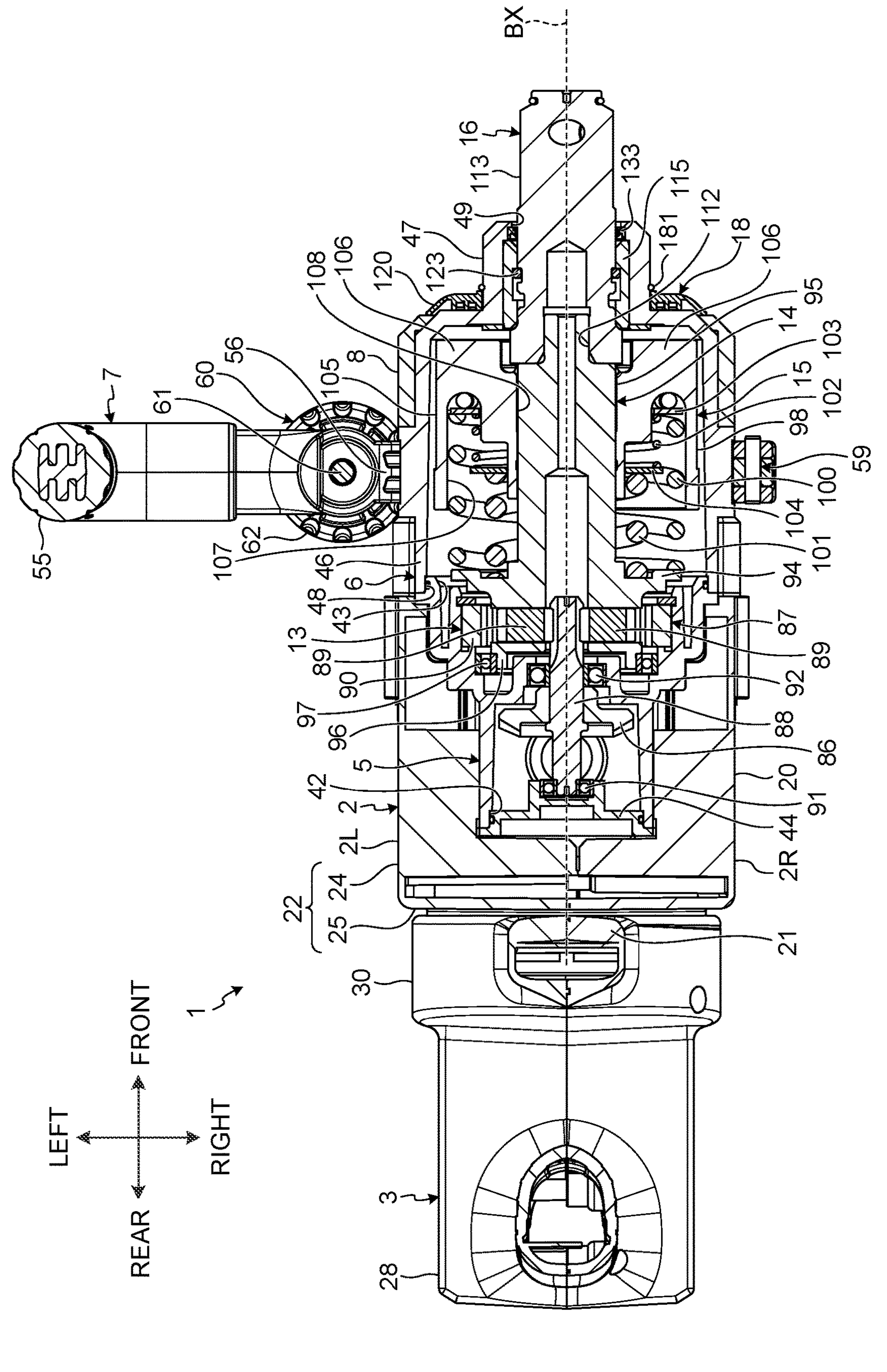
FIG. 10 is a cross-sectional view that shows the impact tool according to the embodiment.

FIG. 1 is an oblique view, viewed from the front-left, that shows the impact tool 1 according to a non-limiting, representative embodiment of the present teachings. FIG. 2 is an oblique view, viewed from the rear-right, that shows the impact tool 1 according to the embodiment. FIG. 3 is a drawing, viewed from the right, of the impact tool 1 according to the embodiment. FIG. 4 is a drawing, viewed from the left, of the impact tool 1 according to the embodiment. FIG. 5 is a drawing, viewed from the rear, of the impact tool 1 according to the embodiment. FIG. 6 is a drawing, viewed from the front, of the impact tool 1 according to the embodiment. FIG. 7 is a drawing, viewed from above, of the impact tool 1 according to the embodiment. FIG. 8 is a drawing, viewed from below, of the impact tool 1 according to the embodiment. FIG. 9 is a cross-sectional view that shows the impact tool 1 according to the embodiment and corresponds to a cross-sectional auxiliary view taken along line B-B in FIG. 7. FIG. 10 is a cross-sectional view that shows the impact tool 1 according to the embodiment and corresponds to a cross-sectional auxiliary view taken along line A-A in FIG. 3.

In the embodiment, the impact tool 1 is an impact wrench, which is one kind of fastening tool. The impact tool 1 comprises a main-body housing 2, a grip housing 3, a motor housing 4, a gear case 5, a hammer case 6, a side handle 7, a bumper 8, a battery-mounting part 9, a motor 10, a controller 11, a fan 12, a speed-reducing mechanism 13, a spindle 14, an impact mechanism 15, an anvil 16, a trigger switch 17, and a light assembly 18.

The main-body housing 2 houses the gear case 5. At least a portion of the main-body housing 2 is disposed forward of the grip housing 3. At least a portion of the main-body housing 2 is disposed upward of the motor housing 4. The main-body housing 2 is disposed rearward of the hammer case 6. The main-body housing 2 is coupled to the grip housing 3. The main-body housing 2 is connected to the motor housing 4. The main-body housing 2 is fixed to the hammer case 6.

The main-body housing 2 is made of a synthetic resin (polymer). Nylon (polyamide) is an illustrative example of the synthetic resin that forms the main-body housing 2. The main-body housing 2 comprises a left main-body housing 2L and a right main-body housing 2R, which is disposed rightward of the left main-body housing 2L. The left main-body housing 2L and the right main-body housing 2R constitute a pair of half housings. The left main-body housing 2L and the right main-body housing 2R are fixed to each other by a plurality of screws 19.

The main-body housing 2 comprises a main-body part 20 and a protruding part 21, which protrudes rearward from the main-body part 20. The main-body part 20 comprises a gear-case housing part 22, which houses the gear case 5, and a motor-housing connection part 23, which is connected to the motor housing 4. The gear-case housing part 22 comprises a tube part 24, which is disposed around the gear case 5, and a rear-wall part 25, which is disposed at a rear-end portion of the tube part 24. The motor-housing connection part 23 is disposed such that it protrudes downward from a rear portion of the gear-case housing part 22. The motor-housing connection part 23 is disposed rearward of the motor housing 4. The protruding part 21 is coupled to the grip housing 3. A portion of the protruding part 21 protrudes rearward from the gear-case housing part 22. A portion of the protruding part 21 protrudes rearward from the motor-housing connection part 23.

The grip housing 3 is configured (designed) to be gripped by a user. The grip housing 3 houses the controller 11. The grip housing 3 supports the trigger switch 17. At least a portion of the grip housing 3 is disposed rearward of the main-body housing 2. The grip housing 3 is coupled to the main-body housing 2 such that it is movable relative to the main-body housing 2.

The grip housing 3 is made of a synthetic resin (polymer). Nylon (polyamide) is an illustrative example of the synthetic resin that forms the grip housing 3. The grip housing 3 comprises a left grip housing 3L and a right-grip housing 3R, which is disposed rightward of the left grip housing 3L. The left grip housing 3L and the right-grip housing 3R constitute a pair of half housings. The left grip housing 3L and the right-grip housing 3R are fixed to each other by a plurality of screws 26.

The grip housing 3 comprises: a grip part 27, which is configured (designed) to be gripped by the user; a controller-housing part 28, which houses the controller 11; a battery-connection part 29, on which the battery-mounting part 9 is disposed; and a coupling part 30, which is coupled to the protruding part 21 of the main-body housing 2. The grip part 27 comprises a rear-grip part 31, which extends upward from a rear portion of the controller-housing part 28; an upper-grip part 32, which extends forward from an upper-end portion of the rear-grip part 31; and a front-grip part 33, which extends downward from a front-end portion of the upper-grip part 32. The front-grip part 33 is disposed such that it connects a front-end portion of the upper-grip part 32 and an upper portion of the coupling part 30. The grip part 27 is formed substantially into a ring shape. The trigger switch 17 is disposed at an upper portion of the rear-grip part 31. The battery-connection part 29 is disposed at a lower portion of the controller-housing part 28. At least a portion of the battery-connection part 29 is disposed forward of the controller-housing part 28. The coupling part 30 is disposed at a front portion of the controller-housing part 28.

The motor housing 4 houses the motor 10. The motor housing 4 is disposed downward of the gear case 5. The motor housing 4 is connected to the main-body housing 2. The motor housing 4 is fixed to the gear case 5.

The motor housing 4 is made of a synthetic resin (polymer). Polycarbonate is an illustrative example of the synthetic resin that forms the motor housing 4.

The motor housing 4 comprises a tube part 34, which is disposed around the motor 10; and a lower-wall part 35, which is disposed at a lower-end portion of the tube part 34.

An opening 36 is provided in an upper portion of the motor housing 4. An opening 37 is formed in a lower portion of the gear-case housing part 22.

An opening 38 is provided in a rear portion of the motor housing 4. An opening 39 is provided in the motor-housing connection part 23. An opening 40A is provided at a rear portion of the main-body housing 2. An opening 40B is provided in a front portion of the grip housing 3. The interior space of the motor housing 4 and the interior space of the controller-housing part 28 are connected via the opening 38, the opening 39, the opening 40A, and the opening 40B.

The gear case 5 houses at least a portion of the speed-reducing mechanism 13. The gear case 5 is disposed rearward of the hammer case 6. The gear case 5 is fixed to the hammer case 6.

The gear case 5 is made of a metal. Aluminum and magnesium are illustrative examples of the metal that forms the gear case 5.

The gear case 5 is substantially a tube shape. An opening 41 is provided in a front portion of the gear case 5. An opening 42 is provided in a rear portion of the gear case 5. An opening 43 is provided in a lower portion of the gear case 5. A bearing cover 44 is disposed within the opening 42 of the gear case 5. The bearing cover 44 is fixed to a rear portion of the gear case 5 by screws 45.

The hammer case 6 houses the impact mechanism 15. The hammer case 6 is connected to a front portion of the main-body housing 2. The hammer case 6 is connected to a front portion of the gear case 5.

The hammer case 6 is made of a metal. Aluminum is an illustrative example of the metal that forms the hammer case 6.

The hammer case 6 substantially has a tube shape. The hammer case 6 comprises a first tube part 46 and a second tube part 47. The first tube part 46 is disposed around the impact mechanism 15. The second tube part 47 is disposed forward of the first tube part 46 in the axial direction of the anvil 16. The outer diameter of the second tube part 47 is smaller than the outer diameter of the first tube part 46. An opening 48 is provided in a rear portion of the first tube part 46. An opening 49 is provided in a front portion of the second tube part 47. A front-end portion of the gear case 5 is inserted into the opening 48.

The gear case 5 and the hammer case 6 are fixed by a plurality of screws 50. The gear case 5 comprises a plurality of screw bosses 51. At least a portion of the main-body housing 2 is disposed such that it covers the screw bosses 51. The main-body housing 2 also is fixed to the hammer case 6 by the plurality of screws 50. The hammer case 6 comprises a plurality of screw bosses 52. The screws 50 are inserted into through holes provided in the main-body housing 2 and through holes provided in the screw bosses 51 of the gear case 5. The screws 50 are inserted into screw holes provided in the screw bosses 52 of the hammer case 6. The screws 50 are inserted into through holes in the main-body housing 2 and through holes in the screw bosses 51 from rearward of the screw bosses 51, after which they are inserted into the screw holes of the screw bosses 52.

The motor housing 4 and the gear case 5 are fixed to each other by a plurality of screws 53. The motor housing 4 comprises a plurality of screw bosses 54. The screws 53 are inserted into through holes provided in the screw bosses 54 of the motor housing 4. The screws 53 are inserted into screw holes provided in a lower portion of the gear case 5. The screws 53 are inserted into through holes of the screw boss 54 from downward of the screw bosses 54, after which they are inserted into screw holes of the gear case 5.

The interior space of the motor housing 4 and the interior space of the gear case 5 are connected via the opening 36 and the opening 43.

The interior space of the gear case 5 and the interior space of the hammer case 6 are connected via the opening 41 and the opening 48.

Referring now to FIGS. 1 and 5-8, the side handle 7 is configured to be gripped by the user. The side handle 7 comprises a handle part 55, which is to be gripped by the user, and a base part 56, which is fixed to the hammer case 6. The handle part 55 is disposed leftward of the hammer case 6. The base part 56 comprises a first base part 57 and a second base part 58, which is disposed downward of the first base part 57. The first base part 57 and the second base part 58 each have an arcuate shape. The first base part 57 and the second base part 58 are disposed such that they sandwich the first tube part 46 of the hammer case 6. A cover 460 is disposed at an upper portion of the first tube part 46. At least a portion of the first base part 57 overlaps the cover 460. A right-end portion of the first base part 57 and a right-end portion of the second base part 58 are coupled via hinges 59. A left-end portion of the first base part 57 and a left-end portion of the second base part 58 are each connected to the handle part 55. A left-end portion of the first base part 57 and a left-end portion of the second base part 58 are coupled via a tightening mechanism 60. The tightening mechanism 60 comprises a screw 61, which is disposed within a screw hole provided in a left-end portion of the second base part 58, and a dial 62, which is rotatable relative to the screw 61. The user can rotate the dial 62 by manipulating the dial 62. By manually rotating the dial 62, the distance between the left-end portion of the first base part 57 and the left-end portion of the second base part 58 is changed. By rotating the screw 61 such that the distance between the left-end portion of the first base part 57 and the left-end portion of the second base part 58 becomes shorter, the base part 56 is tightened onto (around) the hammer case 6, and thereby the side handle 7 is fixed to the hammer case 6.

It is noted that, in the embodiment, although the handle part 55 is disposed leftward of the hammer case 6, the handle part 55 can be disposed at any arbitrary location around the circumference of the hammer case 6. For example, the handle part 55 can be disposed leftward of the hammer case 6, upward of the hammer case 6, or downward of the hammer case 6. The position (angle) of the handle part 55 relative to the hammer case 6 is continuously changeable over the entire 360° range.

The bumper 8 is disposed such that it covers at least a portion of the surface of the hammer case 6. In the embodiment, the bumper 8 is disposed such that it covers the surface of the first tube part 46. The bumper 8 protects the hammer case 6. The bumper 8 shields the hammer case 6 from objects around the impact tool 1. The bumper 8 is formed of an elastic body (material) that is softer (more elastic) than the hammer case 6. Styrene-butadiene rubber is an illustrative example of the elastic body that forms the bumper 8.

Referring now to FIGS. 1 and 9, the battery-mounting part 9 is provided on the battery-connection part 29. A battery pack 63 is mounted on the battery-mounting part 9. A portion of the battery-connection part 29 is disposed upward of the battery pack 63, which is mounted on the battery-mounting part 9. A portion of the battery-connection part 29 is disposed forward of the battery pack 63, which is mounted on the battery-mounting part 9.

The battery pack 63 functions as the power supply of the impact tool 1. The battery pack 63 is detachable from the battery-mounting part 9. The battery pack 63 comprises secondary batteries. In the embodiment, the battery pack 63 comprises rechargeable-type lithium-ion batteries. When mounted on the battery-mounting part 9, the battery pack 63 is capable of supplying electric power to the impact tool 1. The motor 10 operates using electric power supplied from the battery pack 63. The controller 11 operates using electric power supplied from the battery pack 63.

The battery-mounting part 9 comprises a plate-shaped terminal block 64. The terminal 64 comprises a plate, which is made of a synthetic resin (polymer), and connection terminals, which are made of a metal and are disposed on (in) the plate. By mounting the battery pack 63 on the battery-mounting part 9, the connection terminals of the battery pack 63 electrically connect to (with) the connection terminals of the terminal block 64. The terminal block 64 is held by a terminal holder 65. The terminal holder 65 is sandwiched between the left grip housing 3L and the right-grip housing 3R. A spring 66 and a cushioning member 67 are disposed at a portion of the battery-connection part 29, which portion is disposed forward of the battery pack 63. The spring 66 is disposed forward of the terminal holder 65. The spring 66 is supported by a portion of the battery-connection part 29, which portion is disposed forward of the terminal block 64. The spring 66 biases the terminal holder 65 rearward. The cushioning member 67 is disposed forward of the battery pack 63, which is mounted on the battery-mounting part 9. The cushioning member 67 is supported by a portion of the battery-connection part 29, which portion is disposed forward of the battery pack 63 mounted on the battery-mounting part 9. Rubber is an illustrative example of the cushioning member 67. The cushioning member 67 makes contact with a front portion of the battery pack 63. For example, in the event that the impact tool 1 is dropped, the impact that acts on the terminal block 64 is cushioned by the elastic force of the spring 66, and the impact that acts on the battery pack 63 is cushioned by the cushioning member 67.

The motor 10 functions as the motive power source (prime mover) of the impact tool 1. The motor 10 is an inner-rotor-type brushless motor. The motor 10 comprises a stator 68, a rotor 69, and a rotor shaft 70. The stator 68 is supported by the motor housing 4. At least a portion of the rotor 69 is disposed inward (in the interior) of the stator 68. The rotor shaft 70 is fixed to the rotor 69. The rotor 69 is rotatable relative to the stator 68 about motor rotational axis MX, which extends in the up-down direction.

The stator 68 comprises a stator core 71, an insulator 72, and coils 73.

The stator core 71 is disposed radially outward of the rotor 69. The stator core 71 comprises a plurality of laminated steel sheets. Each of the steel sheets is a sheet that is made of a metal in which iron is the main component. The stator core 71 comprises a yoke, which has a tube shape, and a plurality of teeth protruding radially inward from an inner-circumferential surface of the yoke.

The insulator 72 is an electrically insulating member that is made of a synthetic resin (polymer). At least a portion of the insulator 72 is provided at an upper portion of the stator core 71. At least a portion of the insulator 72 is provided at a lower portion of the stator core 71. At least a portion of the insulator 72 is disposed such that it covers surfaces of the teeth of the stator core 71.

The coils 73 are respectively mounted on the teeth of the stator core 71 via the insulator 72. The stator core 71 and the coils 73 are electrically insulated from each other by the insulator 72. The coils 73 are connected to each other via a busbar unit 74.

The rotor 69 rotates about motor rotational axis MX. The rotor 69 comprises a rotor core 75 and a rotor magnet or magnets 76.

The rotor core 75 comprises a plurality of laminated steel sheets. The rotor core 75 has a tube shape.

The rotor magnet(s) 76 is (are) fixed to the rotor core 75. In the embodiment, the rotor magnet(s) 76 is (are) disposed in the interior of the rotor core 75.

A sensor board 77 is fixed to the insulator 72. The sensor board 77 detects the position of the rotor 69 in the rotational direction. The sensor board 77 comprises a circuit board, which has a ring shape, and a rotation-detection device, which is supported by the circuit board. At least a portion of the sensor board 77 opposes the rotor magnet(s) 76. By detecting the position(s) of the rotor magnet(s) 76, the rotation-detection device detects the position of the rotor 69 in the rotational direction.

The rotor shaft 70 is disposed inward (in the interior) of the rotor core 75. The rotor shaft 70 is fixed to the rotor core 75. The rotor 69 and the rotor shaft 70 rotate together about motor rotational axis MX. An upper-end portion of the rotor shaft 70 protrudes upward from an upper-end surface of the rotor core 75. A lower-end portion of the rotor shaft 70 protrudes downward from a lower-end surface of the rotor core 75.

The rotor shaft 70 is supported in a rotatable manner by a rotor bearing 78 and a rotor bearing 79. The rotor bearing 78 supports, in a rotatable manner, an upper portion of the rotor shaft 70, which is disposed upward of the upper-end surface of the rotor core 75. The rotor bearing 79 supports, in a rotatable manner, a lower portion of the rotor shaft 70, which is disposed downward of the lower-end surface of the rotor core 75. The rotor bearing 78 is held by the gear case 5. The rotor bearing 79 is held by the motor housing 4.

A first bevel gear 80 is fixed to an upper-end portion of the rotor shaft 70. The first bevel gear 80 is coupled to at least a portion of the speed-reducing mechanism 13. The rotor shaft 70 is coupled to the speed-reducing mechanism 13 via the first bevel gear 80.

The controller 11 outputs control signals that control the motor 10. The controller 11 comprises a circuit board, on which a plurality of electronic parts is mounted. A processor, such as a CPU (central processing unit); nonvolatile memory, such as ROM (read-only memory) and storage; volatile memory, such as RAM (random-access memory); field-effect transistors (FET: field-effect transistor); and resistors are illustrative examples of the electronic parts mounted on the circuit board.

The controller 11 is housed within the controller-housing part 28 of the grip housing 3. Within the controller-housing part 28, the controller 11 is held by a controller case 81.

The fan 12 generates an airflow for cooling the motor 10 and the controller 11. The fan 12 is disposed upward of the stator 68 of the motor 10. The fan 12 is fixed to an upper portion of the rotor shaft 70. The fan 12 is disposed between the rotor bearing 78 and the stator core 71. The fan 12 and the rotor shaft 70 rotate together. Air-intake ports 82 are provided in the lower-wall part 35 of the motor housing 4. Air-exhaust ports 83 are provided in a front portion of an upper portion, a left portion of an upper portion, and a right portion of an upper portion of the tube part 34 of the motor housing 4. Air-intake ports 84 are provided in a left portion and a right portion of the controller-housing part 28. By rotating the fan 12, air will flow from the exterior of the motor housing 4 into the interior space of the motor housing 4 via the air-intake ports 82. The air that has flowed into the interior space of the motor housing 4 flows through the interior space of the motor housing 4, thereby cooling the motor 10. By rotating the fan 12, at least a portion of the air that flows through the interior space of the motor housing 4 is exhausted to the exterior of the motor housing 4 via the air-exhaust ports 83. In addition, by rotating the fan 12, air will flow from the exterior of the grip housing 3 into the interior space of the controller-housing part 28 via the air-intake ports 84. The air that has flowed into the interior space of the controller-housing part 28 flows through the interior space of the controller-housing part 28, thereby cooling the controller 11. By rotating the fan 12, the air that has flowed through the interior space of the controller-housing part 28 is exhausted to the exterior of the motor housing 4 via the air-exhaust ports 83.

In the embodiment, a baffle plate 85 is disposed between the fan 12 and the stator 68. The baffle plate 85 guides the air that flows in response to the rotation of the fan 12.

The speed-reducing mechanism 13 transmits the rotational force of the motor 10 to the impact mechanism 15 via the spindle 14. The speed-reducing mechanism 13 operably couples the rotor shaft 70 and the spindle 14. The speed-reducing mechanism 13 causes the spindle 14 to rotate at a rotational speed that is lower than the rotational speed of the rotor shaft 70.

The speed-reducing mechanism 13 comprises: a second bevel gear 86, which meshes with the first bevel gear 80; and a planetary-gear mechanism 87, which is driven by the rotational force of the motor 10 transmitted via the second bevel gear 86.

The planetary-gear mechanism 87 comprises: a sun gear 88; a plurality of planet gears 89 disposed around the sun gear 88; and an internal gear 90 disposed around the plurality of planet gears 89. The planetary-gear mechanism 87 is housed within the gear case 5. The internal gear 90 is fixedly held to be non-rotatable relative to the housing 2.

The second bevel gear 86 is disposed around the sun gear 88. The second bevel gear 86 is fixed to the sun gear 88. The second bevel gear 86 and the sun gear 88 rotate together. The second bevel gear 86 and the sun gear 88 are rotatable about output rotational axis BX, which extends in the front-rear direction. Output rotational axis BX and motor rotational axis MX are orthogonal to each other. A rear-end portion of the sun gear 88 is supported by a gear bearing 91. An intermediate portion of the sun gear 88 is supported by a gear bearing 92. The gear bearing 91 is held by the bearing cover 44. The gear bearing 92 is held by the gear case 5. By rotating the rotor shaft 70 and thereby rotating the first bevel gear 80, the second bevel gear 86 rotates. By rotating the second bevel gear 86, the sun gear 88 rotates.

Each of the planet gears 89 meshes with the sun gear 88. The planet gears 89 are respectively supported in a rotatable manner by pins 93 on the spindle 14. The spindle 14 is rotated by the planet gears 89. The internal gear 90 comprises inner teeth, which mesh with the planet gears 89. The internal gear 90 is fixed to the gear case 5. A plurality of protruding parts is provided on the outer-circumferential surface of the internal gear 90. The protruding parts of the internal gear 90 respectively engage in a form (shape) fit into recessed parts (recesses) provided on (in) the inner-circumferential surface of the gear case 5. The internal gear 90 is always non-rotatable relative to the gear case 5.

By operating (energizing) the motor 10, the rotor shaft 70 and the first bevel gear 80 will rotate, and thus the second bevel gear 86 and the sun gear 88 will rotate. When the sun gear 88 rotates, the planet gears 89 revolve around the sun gear 88. The planet gears 89 revolve while meshing with the inner teeth of the internal gear 90. Owing to the revolving of the planet gears 89, the spindle 14, which is connected to the planet gears 89 via the pins 93, rotates at a rotational speed that is lower than the rotational speed of the rotor shaft 70.

The spindle 14 rotates owing to the rotational force of the motor 10 transmitted by (via) the speed-reducing mechanism 13. The spindle 14 transmits the rotational force of the motor 10, which was transmitted via the speed-reducing mechanism 13, to the impact mechanism 15. The spindle 14 is rotatable about output rotational axis BX. A rear portion of the spindle 14 is housed within the gear case 5. A front portion of the spindle 14 is housed within the hammer case 6. At least a portion of the spindle 14 is disposed forward of the speed-reducing mechanism 13. The spindle 14 is disposed rearward of the anvil 16.

Referring now to FIGS. 9 and 10, the spindle 14 comprises: a flange part 94; a spindle-shaft part 95, which protrudes forward from the flange part 94 in the axial direction of the spindle 14, and a protruding part 96, which protrudes rearward from the flange part 94 in the axial direction of the spindle 14. The planet gears 89 are respectively supported in a rotatable manner by the flange part 94 and the protruding part 96 via the pins 93. The spindle 14 is supported in a rotatable manner by a spindle bearing 97. The spindle bearing 97 supports the protruding part 96 in a rotatable manner. The spindle bearing 97 is held by the gear case 5.

The impact mechanism 15 impacts the anvil 16 in the rotational direction, thereby rotating the anvil 16 about output rotational axis BX. The impact mechanism 15 is driven by the motor 10. The impact mechanism 15 is rotatable about output rotational axis BX. The rotational force of the motor 10 is transmitted to the impact mechanism 15 via the speed-reducing mechanism 13 and the spindle 14. The impact mechanism 15 impacts the anvil 16 in the rotational direction using the rotational force of the spindle 14, which is rotated by the motor 10.

The impact mechanism 15 is housed within the first tube part 46 of the hammer case 6. The impact mechanism 15 comprises a hammer 98, balls 99, a first coil spring 100, a second coil spring 101, a third coil spring 102, a first washer 103, and a second washer 104.

The hammer 98 is disposed forward of the speed-reducing mechanism 13. The hammer 98 is disposed around the spindle 14. The hammer 98 is held by the spindle 14. The balls 99 are disposed between the spindle 14 and the hammer 98. The hammer 98 comprises a hammer body 105, which has a tube shape, and hammer-projection parts 106, which are provided at a front portion of the hammer body 105. A ring-shaped recessed part 107 is provided on a rear surface of the hammer body 105. The recessed part 107 recesses forward from a rear surface of the hammer body 105.

The hammer 98 is disposed around the spindle-shaft part 95. The hammer 98 has a hole 108 in which the spindle-shaft part 95 is disposed.

The hammer 98 is rotated by the motor 10. The rotational force of the motor 10 is transmitted to the hammer 98 via the speed-reducing mechanism 13 and the spindle 14. The hammer 98 is rotatable, together with the spindle 14, using the rotational force of the spindle 14, which is rotated by the motor 10. The hammer 98 and the spindle 14 each rotate about output rotational axis BX.

The first washer 103 is disposed inward (in the interior) of the recessed part 107. The first washer 103 is supported by the hammer 98 via a plurality of balls 109. The balls 109 are disposed forward of the first washer 103.

The second washer 104 is disposed rearward of the first washer 103 inward (in the interior) of the recessed part 107. The outer diameter of the second washer 104 is smaller than the outer diameter of the first washer 103. The second washer 104 and the hammer 98 are movable relative to the front-rear direction.

The first coil spring 100 is disposed around (surrounding) the spindle-shaft part 95. A rear-end portion of the first coil spring 100 is supported by the flange part 94. A front-end portion of the first coil spring 100 is disposed inward (in the interior) of the recessed part 107 and is supported by the first washer 103. The first coil spring 100 continuously generates an elastic force that causes (biases, urges) the hammer 98 to move forward.

The second coil spring 101 is disposed around (surrounding) the spindle-shaft part 95. The second coil spring 101 is disposed radially inward (in the interior) of the first coil spring 100. A rear-end portion of the second coil spring 101 is supported by the flange part 94. A front-end portion of the second coil spring 101 is disposed inward (in the interior) of the recessed part 107 and is supported by the second washer 104. When the hammer 98 moves rearward, the second coil spring 101 generates an elastic restoring force that causes the hammer 98 to move (return) forward.

The third coil spring 102 is disposed around (surrounding) the spindle-shaft part 95. The third coil spring 102 is disposed radially inward (in the interior) of the first coil spring 100. The third coil spring 102 is disposed inward (in the interior) of the recessed part 107. A rear-end portion of the third coil spring 102 is supported by the second washer 104. A front-end portion of the third coil spring 102 is supported by the first washer 103. The third coil spring 102 biases the second coil spring 101 rearward. Owing to the elastic force of the third coil spring 102, a rear-end portion of the second coil spring 101 is pressed against the flange part 94. Thereby, the second coil spring 101 is held firmly respect to the flange part 94.

The balls 99 are made of a metal such as steel. The balls 99 are disposed between the spindle-shaft part 95 and the hammer 98. The spindle 14 has a spindle groove 110 in which at least some of the balls 99 are disposed. The spindle groove 110 is provided on a portion of the outer surface of the spindle-shaft part 95. The hammer 98 has a hammer groove 111 in which at least some of the balls 99 are disposed. The hammer groove 111 is provided on a portion of the inner surface of the hammer 98. The balls 99 are disposed between the spindle groove 110 and the hammer groove 111. The balls 99 can roll along the inner side of the spindle groove 110 and the inner side of the hammer groove 111. The hammer 98 is movable along with the balls 99. The spindle 14 and the hammer 98 each can move relative to each other, within a movable range that is defined by the spindle groove 110 and the hammer groove 111, in a direction parallel to output rotational axis BX and in a rotational direction about output rotational axis BX.

The anvil 16 is the output part of the impact tool 1 and it is rotated in response to rotational force output by the motor 10. At least a portion of the anvil 16 is disposed forward of the hammer 98.

The anvil 16 has an anvil-recessed part (anvil recess, anvil blind hole) 112. The anvil-recessed part 112 is provided at (in) a rear-end portion of the anvil 16. The anvil-recessed part 112 recesses forward from the rear-end portion of the anvil 16. The spindle 14 is disposed rearward of the anvil 16. A front-end portion of the spindle-shaft part 95 is disposed within the anvil-recessed part 112.

The anvil 16 comprises an anvil-shaft part (anvil shaft) 113 and anvil-projection parts (projections, flanges, lugs) 114. The anvil-shaft part 113 is disposed forward of the impact mechanism 15 in the axial direction of the anvil-shaft part 113. The anvil-projection parts 114 protrude radially outward of the anvil-shaft part 113 from a rear-end portion of the anvil-shaft part 113. The anvil-projection parts 114 are impacted in the rotational direction by the impact mechanism 15 and thus rotated about output rotational axis BX, thereby rotating the anvil-shaft part 113.

A front-end portion of the anvil-shaft part 113 is disposed forward of the hammer case 6 via the opening 49 in the axial direction of the anvil-shaft part 113. A tool accessory, such as a socket, can be mounted on the front-end portion of the anvil-shaft part 113.

The anvil 16 is supported in a rotatable manner by an anvil bearing 115. The anvil bearing 115 is disposed around (surrounding) the anvil-shaft part 113. The anvil 16 is rotatable about output rotational axis BX. The anvil bearing 115 is held by the hammer case 6. The anvil bearing 115 is disposed inward (in the interior) of the second tube part 47 of the hammer case 6. The anvil bearing 115 is held by the second tube part 47 of the hammer case 6.

The trigger switch 17 is manipulated by the user to operate the motor 10. The operation of the motor 10 refers to the coils 73 of the stator 68 being energized and thereby the rotor 69 rotating. The trigger switch 17 is provided at an upper portion of the rear-grip part 31. The trigger switch 17 comprises a trigger lever 116 and a switch main body 117. The switch main body 117 is disposed in the interior space of the rear-grip part 31. The trigger lever 116 protrudes forward from an upper portion of a front portion of the rear-grip part 31. The trigger lever 116 is manipulated (pressed) by the user so that it moves rearward. By manipulating the trigger lever 116 such that it moves rearward, the motor 10 operates (is energized). By releasing the manipulation (pressing) of the trigger lever 116, the operation (energization) of the motor 10 stops.

The light assembly 18 emits illumination light. The light assembly 18 illuminates the anvil 16 and the periphery of the anvil 16 with illumination light. The light assembly 18 illuminates forward of the anvil 16 with illumination light. In addition, the light assembly 18 illuminates the socket that has been mounted on the anvil 16 and the periphery of the socket with illumination light. In the embodiment, the light assembly 18 comprises: a circuit board 118; a light-emitting device 119, which is installed on a front surface of the circuit board 118; and a ring-shaped light cover 120, which is disposed forward of the circuit board 118. The light cover 120 is disposed such that it covers the light-emitting device 119. The light assembly 18 is disposed around the second tube part 47 of the hammer case 6. A ring spring 181, which retrains the light assembly 18 from coming off of the second tube part 47 in the forward direction, is disposed forward of the light assembly 18.

Restraining Member

Figure 11:
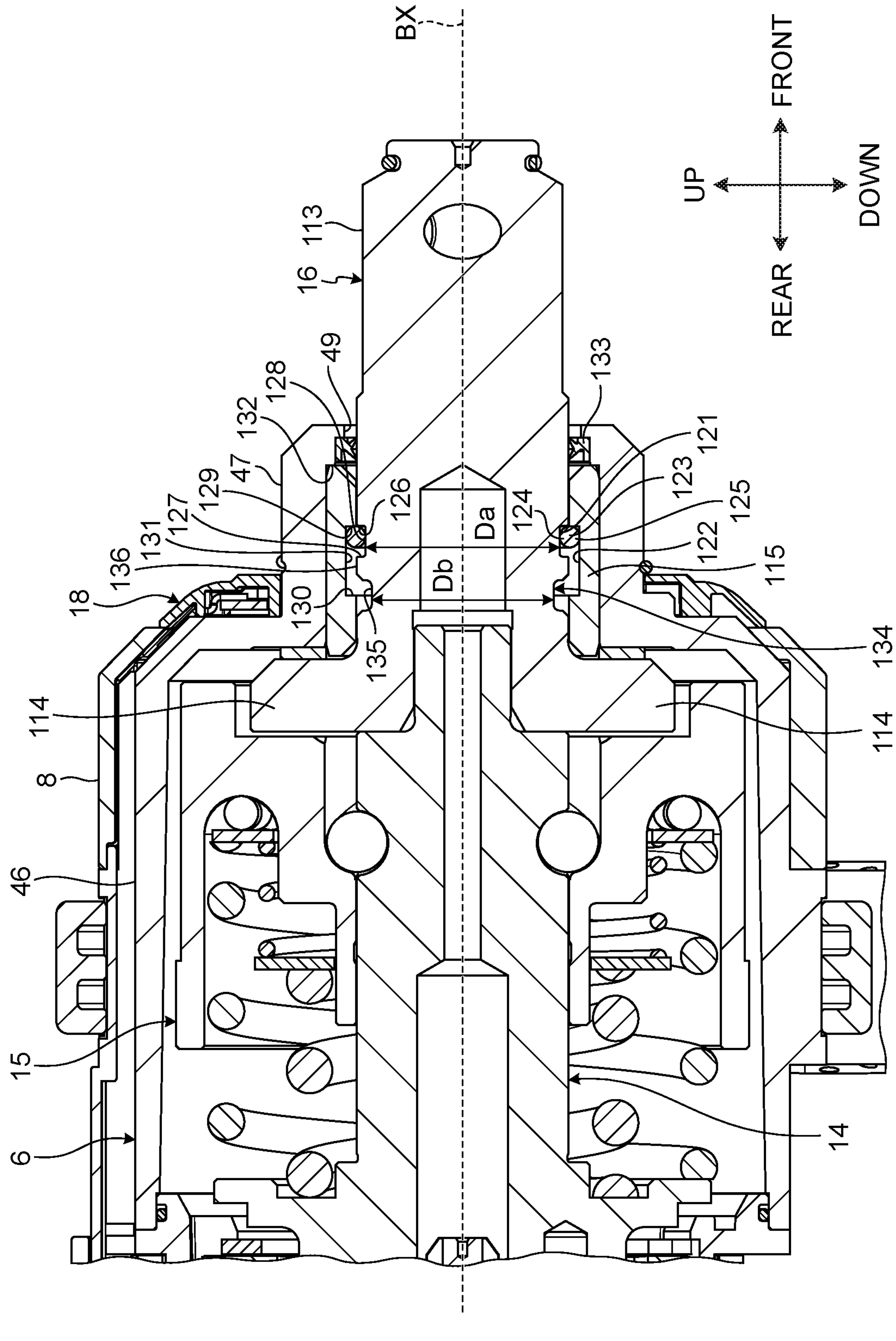
FIG. 11 is a partial, cross-sectional view of the impact tool according to the embodiment.
Figure 12:
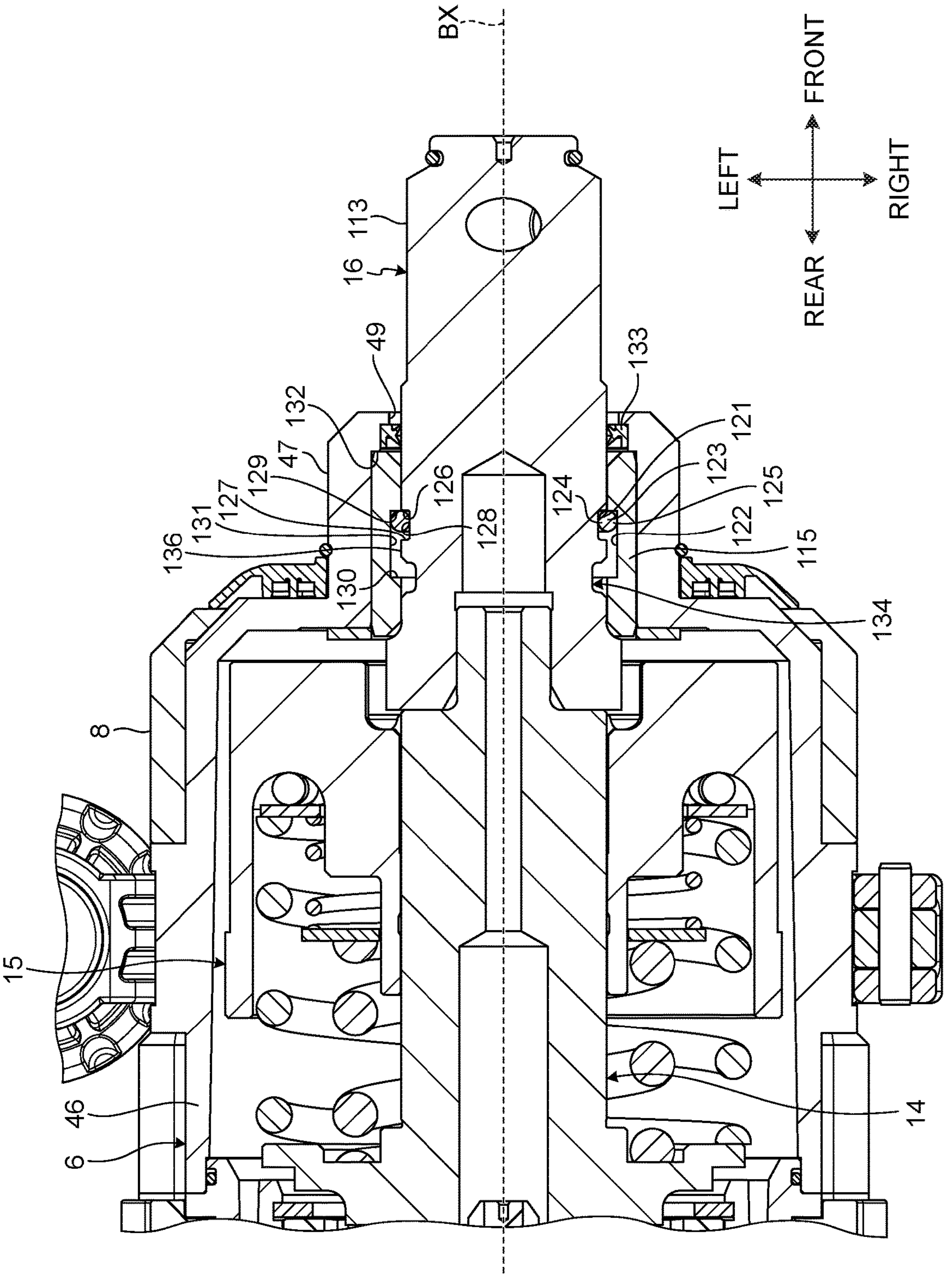
FIG. 12 is a partial, cross-sectional view of the impact tool according to the embodiment.

FIG. 11 is a partial, cross-sectional view of the impact tool 1 according to the embodiment and corresponds to a partial, enlarged view of FIG. 9. FIG. 12 is a partial, cross-sectional view of the impact tool 1 according to the embodiment and corresponds to a partial, enlarged view of FIG. 10.

In FIGS. 11 and 12, a direction parallel to output rotational axis BX is called the axial direction where appropriate, a direction that goes around output rotational axis BX is called the circumferential direction or the rotational direction where appropriate, and a radial direction of output rotational axis BX is called the radial direction where appropriate. In addition, in the radial direction, a location that is proximate to or a direction that approaches output rotational axis BX is called radially inward (or inward in the radial direction) where appropriate, and a location distant from or a direction that leads away from output rotational axis BX is called radially outward (or outward in the radial direction) where appropriate.

In a cross section orthogonal to output rotational axis BX, the outer-circumferential surface of the anvil-shaft part 113 is a circular shape. In a cross section orthogonal to output rotational axis BX, the inner-circumferential surface of the anvil bearing 115 is a circular shape.

As shown in FIGS. 11 and 12, a first groove part (first groove) 121 is formed on (in) the outer-circumferential surface of the anvil-shaft part 113, preferably so as to encircle output rotational axis BX.

A second groove part (second groove) 122 is formed on (in) the inner-circumferential surface of the anvil bearing 115, preferably so as to encircle output rotational axis BX.

In the embodiment, the anvil bearing 115 is a slide bearing. The second groove part 122 is formed on an inner-circumferential surface of the slide bearing. The anvil bearing 115 has a tube shape. In the embodiment, a sleeve is used as the anvil bearing 115. It is noted that, for example, a slide bearing may be formed by impregnating, with a lubricating oil, a tube-shaped porous-metal body manufactured by a powder metallurgy method.

The impact tool 1 comprises a restraining member 123 that restrains (blocks, impedes) a broken portion of the anvil-shaft part 113 from coming off (out) of the hammer case 6 (i.e. separating or dislodging from the impact tool 1) in the forward direction in the event the anvil-shaft part 113 breaks during operation of the impact tool 1. The restraining member 123 comprises a first portion 124, which is disposed within (in contact with) the first groove part 121, and a second portion 125, which is disposed within (in contact with) the second groove part 122. The first portion 124 is the radially-inward side portion of the restraining member 123. The second portion 125 is the radially-inward side portion of the restraining member 123 and is disposed more radially outward than the first portion 124.

The restraining member 123 has a ring shape that encircles output rotational axis BX. In the embodiment, the restraining member 123 is an O-ring that contacts both the inner surface of the first groove part 121 and the inner surface of the second groove part 122.

The inner surface of the first groove part 121 includes a first front-side (radially extending) surface 126, a first rear-side (radially extending) surface 127, and a first circumferential surface 128. The first front-side surface 126 faces rearward in the axial direction of the anvil-shaft part 113. The first rear-side surface 127 is disposed rearward of the first front-side surface 126 in the axial direction of the anvil-shaft part 113. The first rear-side surface 127 faces forward in the axial direction of the anvil-shaft part 113. The first circumferential surface 128 is connected: (i) to a radially inward end portion of the first front-side surface 126 and (ii) to a radially inward end portion of the first rear-side surface 127. The first circumferential surface 128 faces radially outward with respect to the axial direction (rotational axis) of the anvil-shaft part 113.

The inner surface of the second groove part 122 includes a second front-side (radially extending) surface 129, a second rear-side (radially extending) surface 130, and a second circumferential surface 131. The second front-side surface 129 faces rearward in the axial direction of the anvil-shaft part 113. The second rear-side surface 130 is disposed rearward of the second front-side surface 129 in the axial direction of the anvil-shaft part 113. The second rear-side surface 130 faces forward in the axial direction of the anvil-shaft part 113. The second circumferential surface 131 is connected: (i) to a radially outward end portion of the second front-side surface 129 and (ii) to a radially outward end portion of the second rear-side surface 130. The second circumferential surface 131 faces radially inward with respect to the axial direction (rotational axis) of the anvil-shaft part 113.

In the embodiment, the depth of the first groove part 121 and the depth of the second groove part 122 are substantially equal to each other. It is noted that the depth of the first groove part 121 may be greater than the depth of the second groove part 122, or the depth of the second groove part 122 may be greater than the depth of the first groove part 121. The depth of the first groove part 121 refers to the dimension of the first groove part 121 in the radial direction. That is, the depth of the first groove part 121 refers to the distance between the outer-circumferential surface of the anvil-shaft part 113 and the first circumferential surface 128 in the radial direction. The depth of the second groove part 122 refers to the dimension of the second groove part 122 in the radial direction. That is, the depth of the second groove part 122 refers to the distance between the inner-circumferential surface of the anvil bearing 115, which contacts (slidably supports) the anvil-shaft part 113, and the second circumferential surface 131 in the radial direction.

The dimension (axial length) of the first groove part 121 in the axial direction is shorter than the dimension (axial length) of the second groove part 122 in the axial direction. The dimension of the first groove part 121 in the axial direction refers to the distance between the first front-side surface 126 and the first rear-side surface 127. The dimension of the second groove part 122 in the axial direction refers to the distance between the second front-side surface 129 and the second rear-side surface 130. In the examples shown in FIG. 11 and FIG. 12, the position of the first front-side surface 126 and the position of the second front-side surface 129 in the axial direction are substantially the same. The first rear-side surface 127 is disposed forward of the second rear-side surface 130 in the axial direction of the anvil-shaft part 113.

It is noted that the position of the first front-side surface 126 and the position of the second front-side surface 129 in the axial direction may be different from each other. The first rear-side surface 127 may be disposed forward of the second rear-side surface 130 in the axial direction of the anvil-shaft part 113 or may be disposed rearward of the second rear-side surface 130 in the axial direction of the anvil-shaft part 113.

The restraining member 123 is disposed such that it (i.e. the first portion 124) contacts the first circumferential surface 128 and it (i.e. the second portion 125) contacts the second circumferential surface 131. As described above, in the embodiment, the restraining member 123 is an O-ring. The restraining member 123 is slightly compressed by the first circumferential surface 128 and the second circumferential surface 131. The restraining member 123 seals the boundary (gap, space) between the first circumferential surface 128 and the second circumferential surface 131.

In the examples shown in FIGS. 11 and 12, the restraining member 123 is disposed such that it contacts both the first front-side surface 126 and the second front-side surface 129. The restraining member 123 seals the boundary (gap, space) between the anvil-shaft part 113 and the anvil bearing 115.

The hammer case 6 comprises a bearing-support surface 132, which contacts front end of the anvil bearing 115. The bearing-support surface 132 is provided at (on) a front-end portion of the second tube part 47. The bearing-support surface 132 faces rearward. The bearing-support surface 132 presses the anvil bearing 115 from the front. The bearing-support surface 132 restrains (blocks) the anvil bearing 115 from coming off (out) of the hammer case 6 in the forward direction. Within a plane orthogonal to output rotational axis BX, the bearing-support surface 132 has a ring shape. The opening 49 is defined radially inward of the bearing-support surface 132.

A front-end portion of the anvil-shaft part 113 is disposed forward of the second tube part 47 through the opening 49. At least a portion of the anvil-shaft part 113 is disposed in the interior of the opening 49. A sealing member 133 is provided at a front-end portion of the second tube part 47. The sealing member 133 is disposed in the interior of the opening 49. The sealing member 133 seals the boundary (gap, space) between a front-end portion of the second tube part 47 and the anvil-shaft part 113. The sealing member 133 is disposed forward of the restraining member 123 in the axial direction of the anvil-shaft part 113.

The anvil-shaft part 113 comprises a breakage starting-point portion 134, which is disposed rearward of the first groove part 121. The section modulus of the anvil-shaft part 113 at (along, within) the breakage starting-point portion 134 is smaller than the section modulus of the anvil-shaft part 113 at (along, within) the first groove part 121. That is, the section modulus of the anvil-shaft part 113 that passes through the breakage starting-point portion 134 and is orthogonal to output rotational axis BX is smaller than the section modulus of the anvil-shaft part 113 that passes through the first groove part 121 and is orthogonal to output rotational axis BX. In the anvil-shaft part 113, the breakage starting-point portion 134 is the portion at which the strength is lowest with respect to bending moment. That is, in the anvil-shaft part 113, the breakage starting-point portion 134 is the portion that is most likely to break when an excessively heavy load acts upon the anvil-shaft part 113. In addition or in the alternative, the cross-sectional area of the anvil-shaft part 113 in a first plane perpendicular to the axial direction (rotational axis) of the anvil-shaft part 113, which first plane passes through the breakage starting-point portion 134, is smaller (less) than the cross-sectional area of the anvil-shaft part 113 in a second plane perpendicular to the axial direction (rotational axis) of the anvil-shaft part 113, which second plane passes through the first groove part 121.

A third groove part (third groove) 135 is formed (defined) on (in) the outer-circumferential surface of the anvil-shaft part 113. The third groove part 135 is formed rearward of the first groove part 121 in the axial direction of the anvil-shaft part 113. The third groove part 135 is formed on the outer-circumferential surface of the anvil-shaft part 113 so as to encircle output rotational axis BX.

The depth of the third groove part 135 is greater than the depth of the first groove part 121. The depth of the third groove part 135 refers to the dimension of the third groove part 135 in the radial direction. Diameter Db of the anvil-shaft part 113 at (along, in) the third groove part 135 is smaller than diameter Da of the anvil-shaft part 113 at (along, in) the first groove part 121. The breakage starting-point portion 134 includes the anvil-shaft part 113 at the third groove part 135; in alternate wording, the breakage starting-point portion 134 is defined within the dimension (axial length) of the third groove part 135 in the axial direction of the anvil-shaft part 113. In the axial direction, a large-diameter part 136 of the anvil-shaft part 113, the diameter of which is larger than diameter Da and diameter Db, is provided (disposed) between the first groove part 121 and the third groove part 135. The first rear-side surface 127 is disposed at a front portion of the large-diameter part 136.

Figure 13:
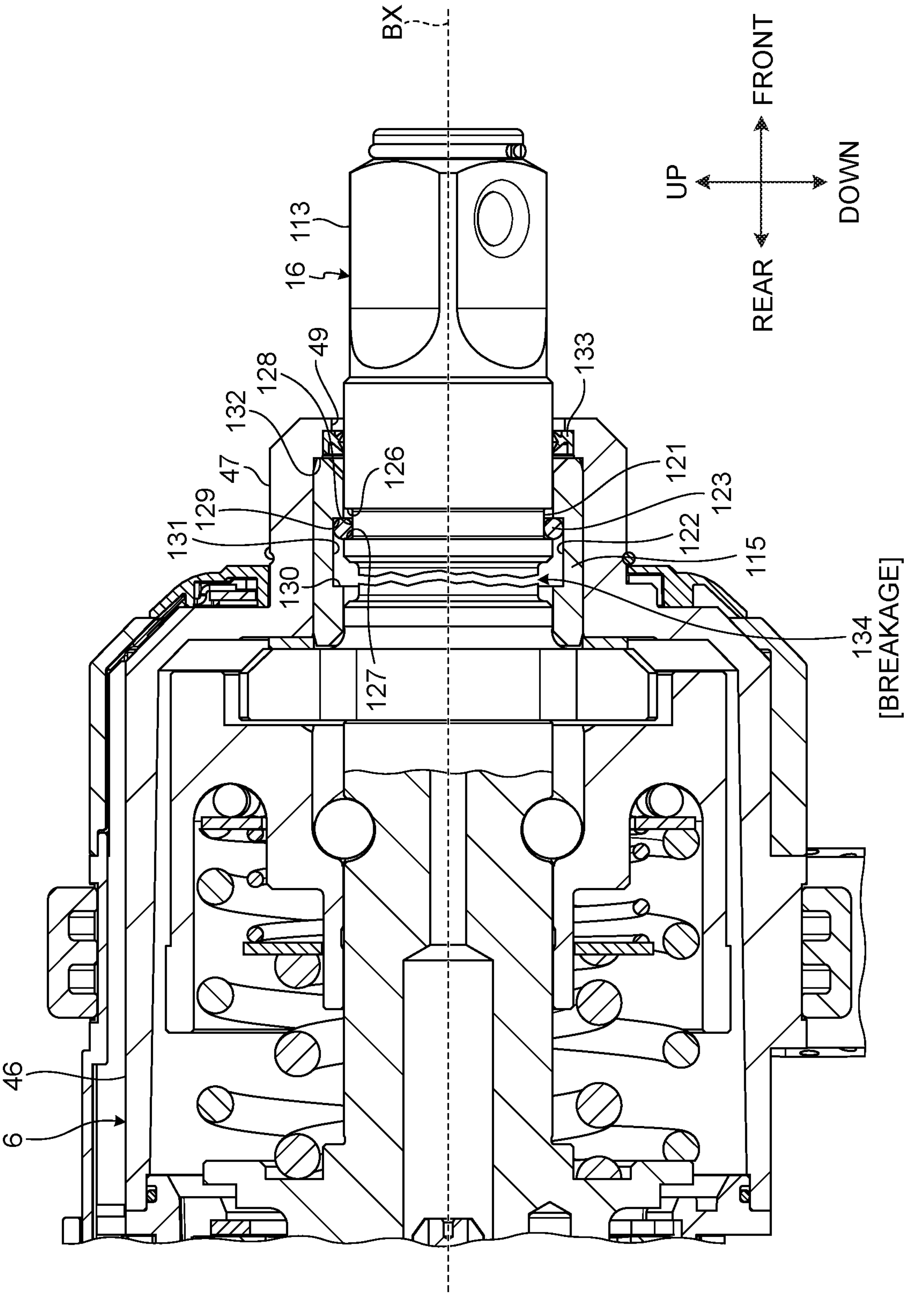
FIG. 13 is a cross-sectional view that shows the state in which an anvil-shaft part according to the embodiment has fractured.

FIG. 13 is a cross-sectional view that shows the state in which a portion of the anvil-shaft part 113 according to the embodiment has fractured. For example, if an excessively heavy load acts upon the anvil-shaft part 113 during fastening work, there is a possibility that at least a portion of the anvil-shaft part 113 will break. In the embodiment, the breakage starting-point portion 134 is provided on (in) the anvil-shaft part 113. Consequently, if an excessively heavy load acts upon the anvil-shaft part 113, the anvil-shaft part 113 is designed to (first) break at the breakage starting-point portion 134, as shown in FIG. 13.

If the anvil-shaft part 113 breaks at the breakage starting-point portion 134, there is a possibility that the (broken) portion of the anvil-shaft part 113 that is forward of the breakage starting-point portion 134 will move forward relative to the hammer case 6. However, according to the embodiment, if the broken portion of the anvil-shaft part 113 moves forward, the first rear-side surface 127 of the first groove part 121 gets caught (blocked, restrained, impeded) by the restraining member 123, so that the broken portion of the anvil-shaft part 113 is blocked from exiting the hammer case 6.

As was noted above, a front-end portion of the anvil bearing 115 makes contact with the bearing-support surface 132 of the hammer case 6. Therefore, even if the anvil-shaft part 113 breaks, the anvil bearing 115 will not move forward relative to the hammer case 6. Moreover, the restraining member 123 is supported by (contacts) the second front-side surface 129 of the second groove part 122. Therefore, the restraining member 123, which is supported by (contacts) the second front-side surface 129 of the anvil bearing 115, also will not move forward relative to the hammer case 6. As shown in FIG. 13, in the state in which the anvil-shaft part 113 has broken at the breakage starting-point portion 134, the restraining member 123 makes contact with the first rear-side surface 127 and the second front-side surface 129. Therefore, the broken portion of the anvil-shaft part 113 gets caught (blocked, restrained, impeded) by the restraining member 123, so that it will not move forward relative to the hammer case 6. Consequently, when the anvil-shaft part 113 breaks (fractures) at (along, within) the breakage starting-point portion 134, the broken portion of the anvil-shaft part 113 is restrained (blocked, impeded) from coming off (out) of the hammer case 6 in the forward direction in the axial direction of the anvil-shaft part 113. That is, if the anvil-shaft part 113 has broken, the broken portion of the anvil-shaft part 113 that is forward of the breakage starting-point portion 134 is restrained (blocked, impeded) from coming off of (separating or dislodging from) the impact tool 1.

Vibration-Isolating Mechanism

Figure 14:
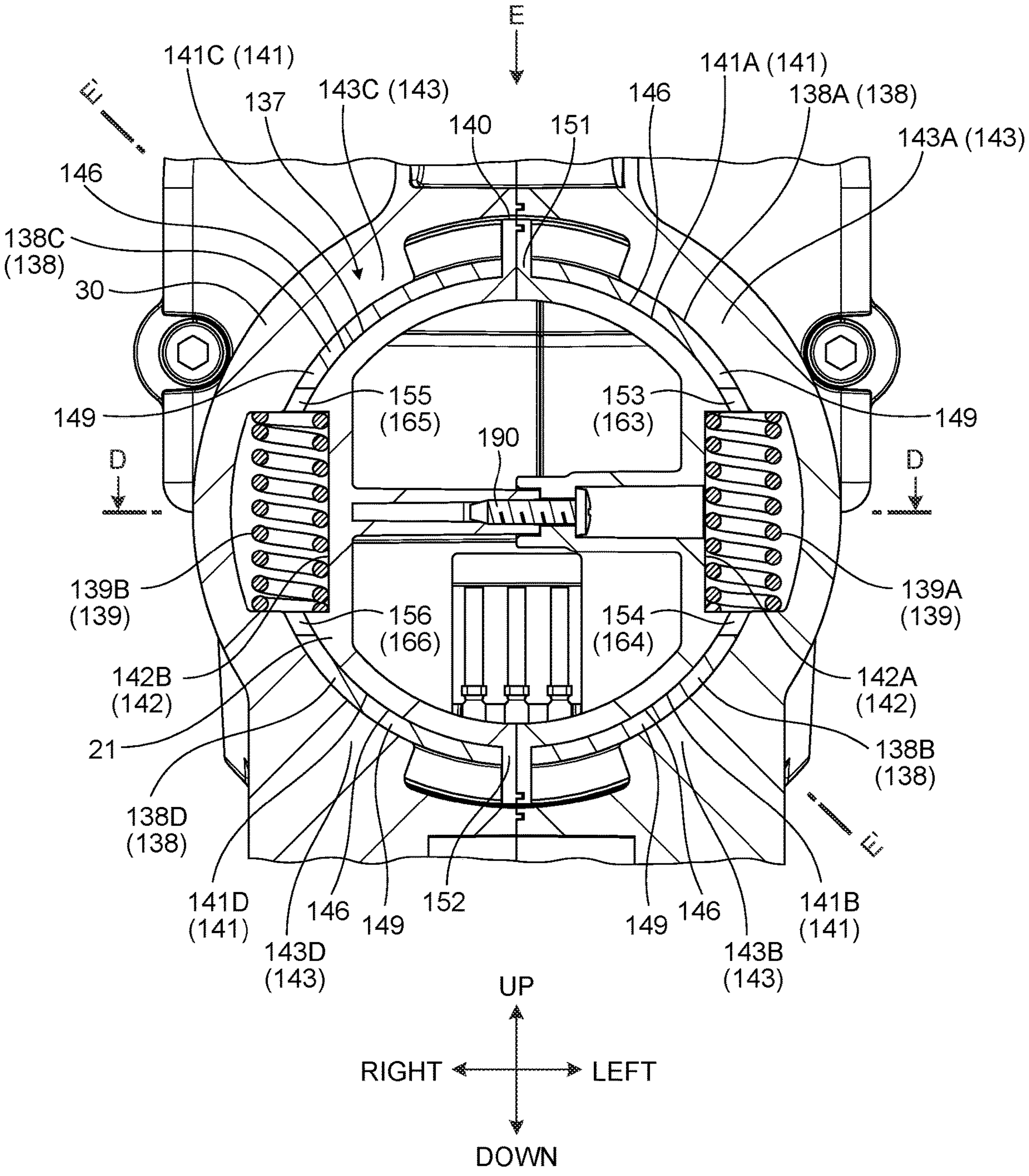
FIG. 14 is a partial, cross-sectional view of the impact tool according to the embodiment.
Figure 15:
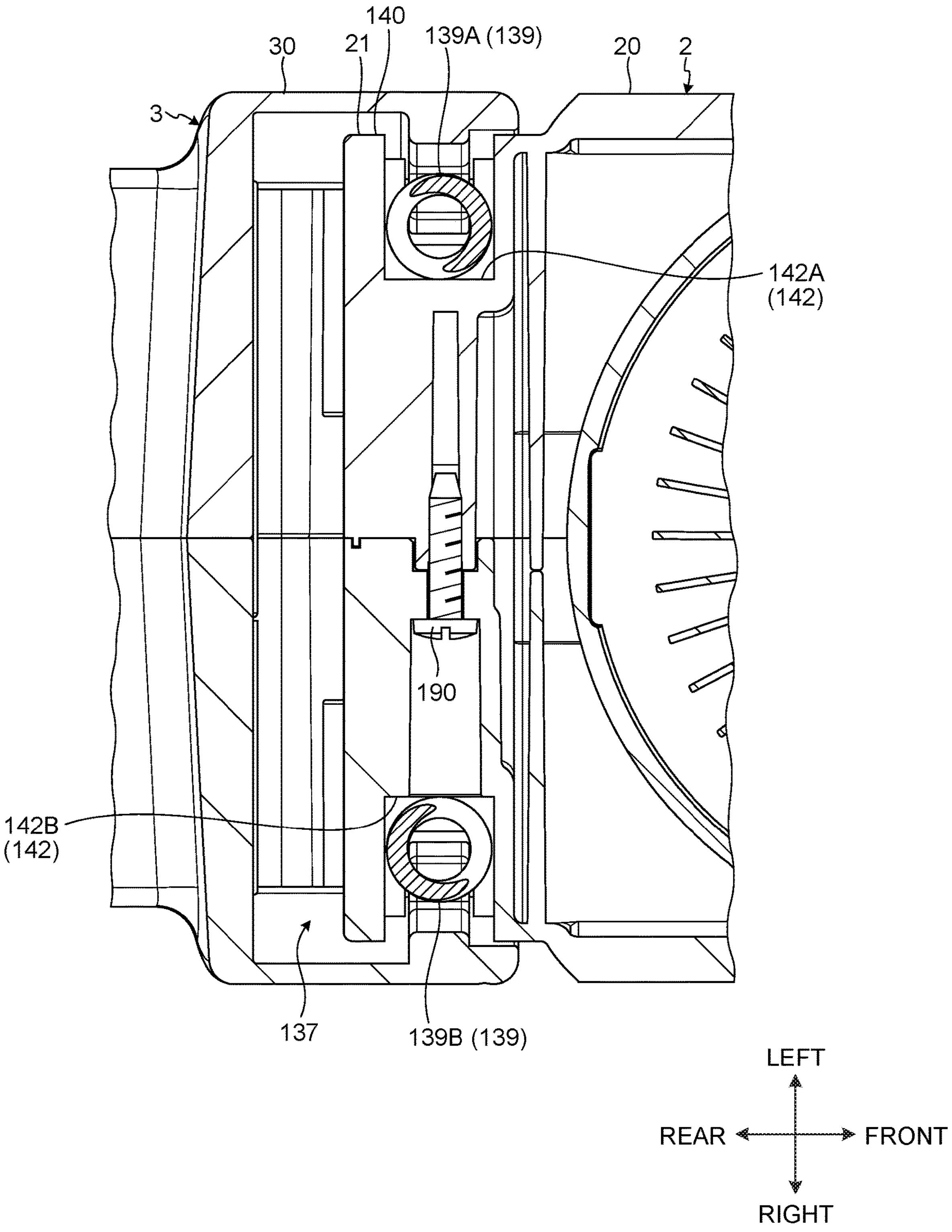
FIG. 15 is a partial, cross-sectional view of the impact tool according to the embodiment.
Figure 16:
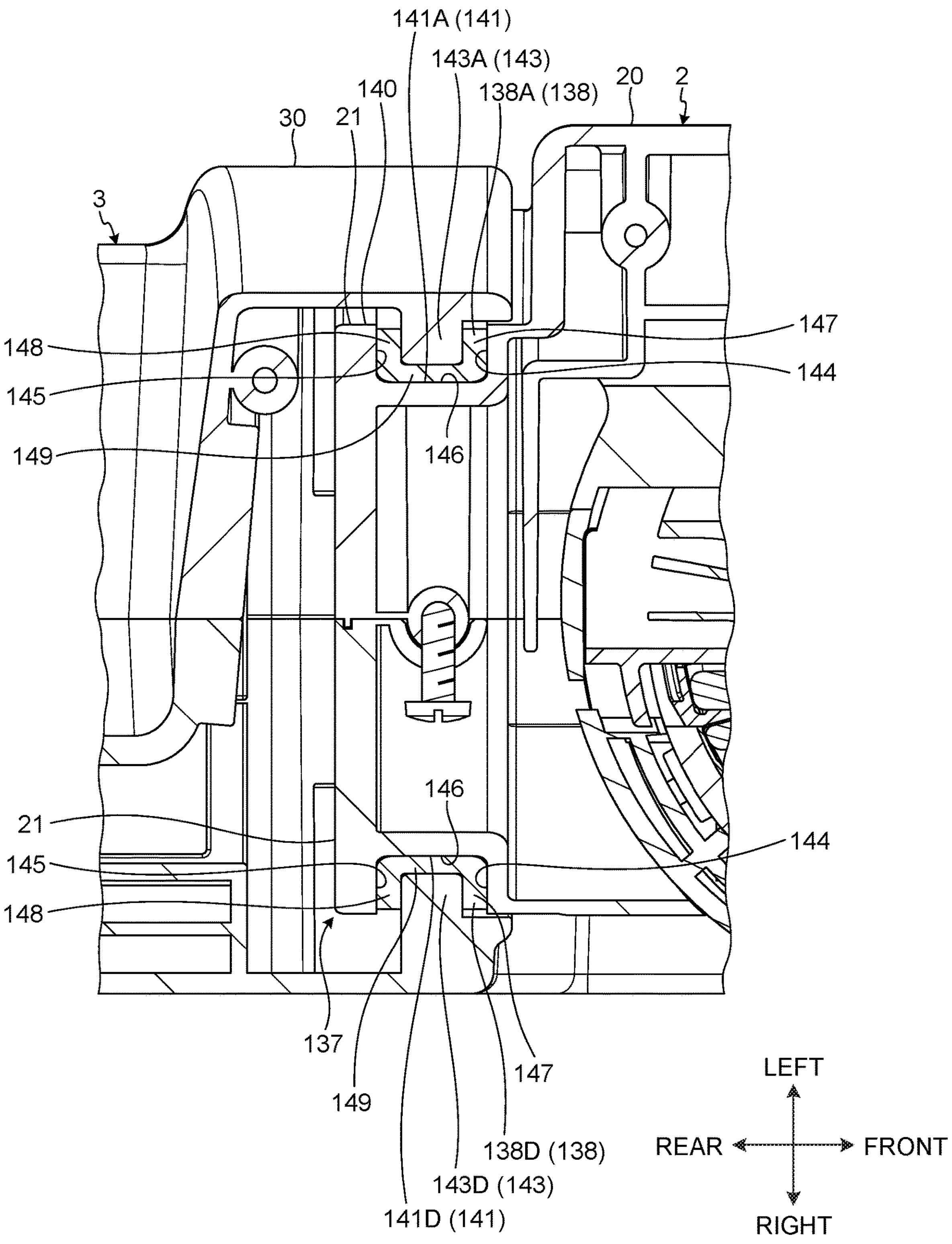
FIG. 16 is a partial, cross-sectional view of the impact tool according to the embodiment.
Figure 17:
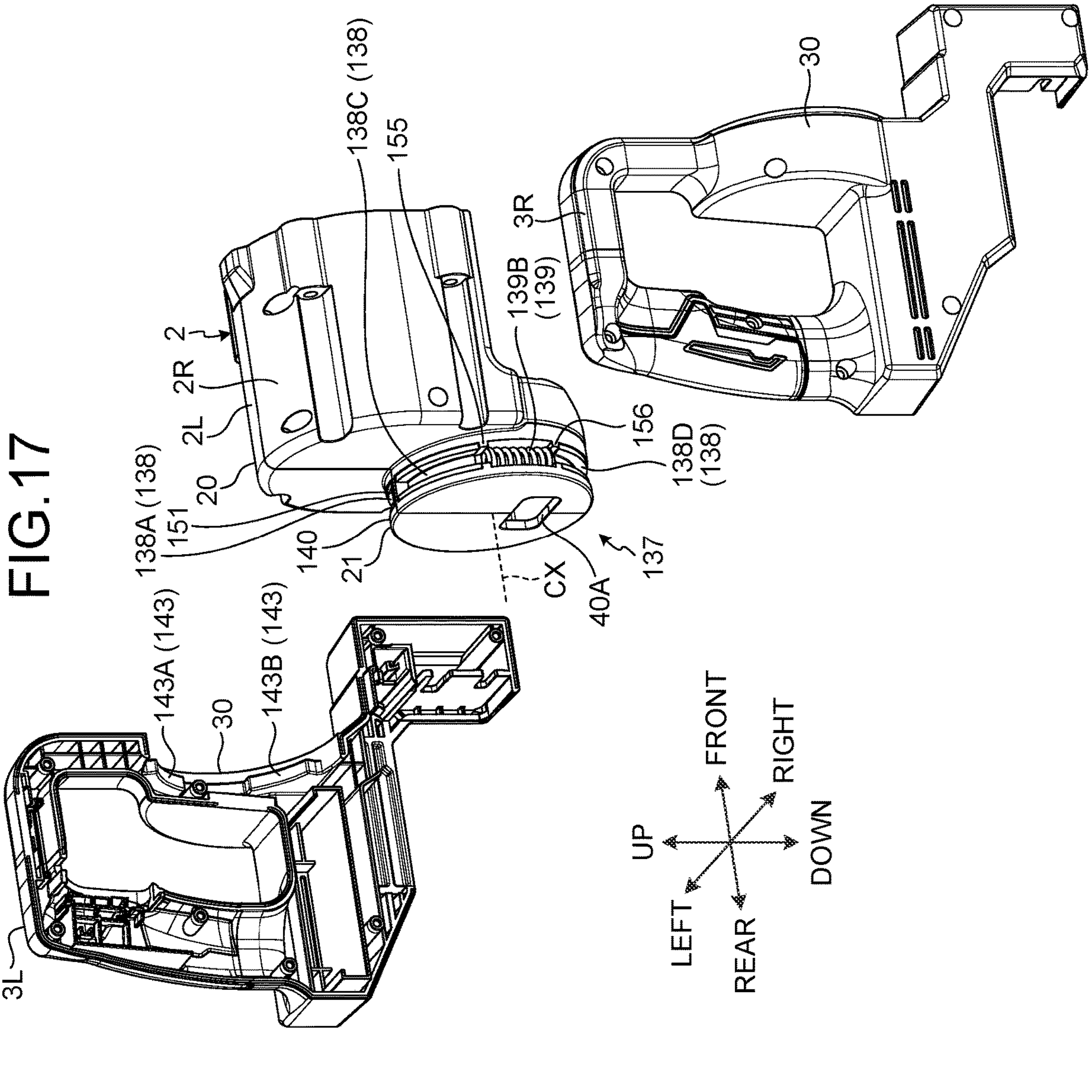
FIG. 17 is a partial, exploded, oblique view of the impact tool according to the embodiment.
Figure 18:
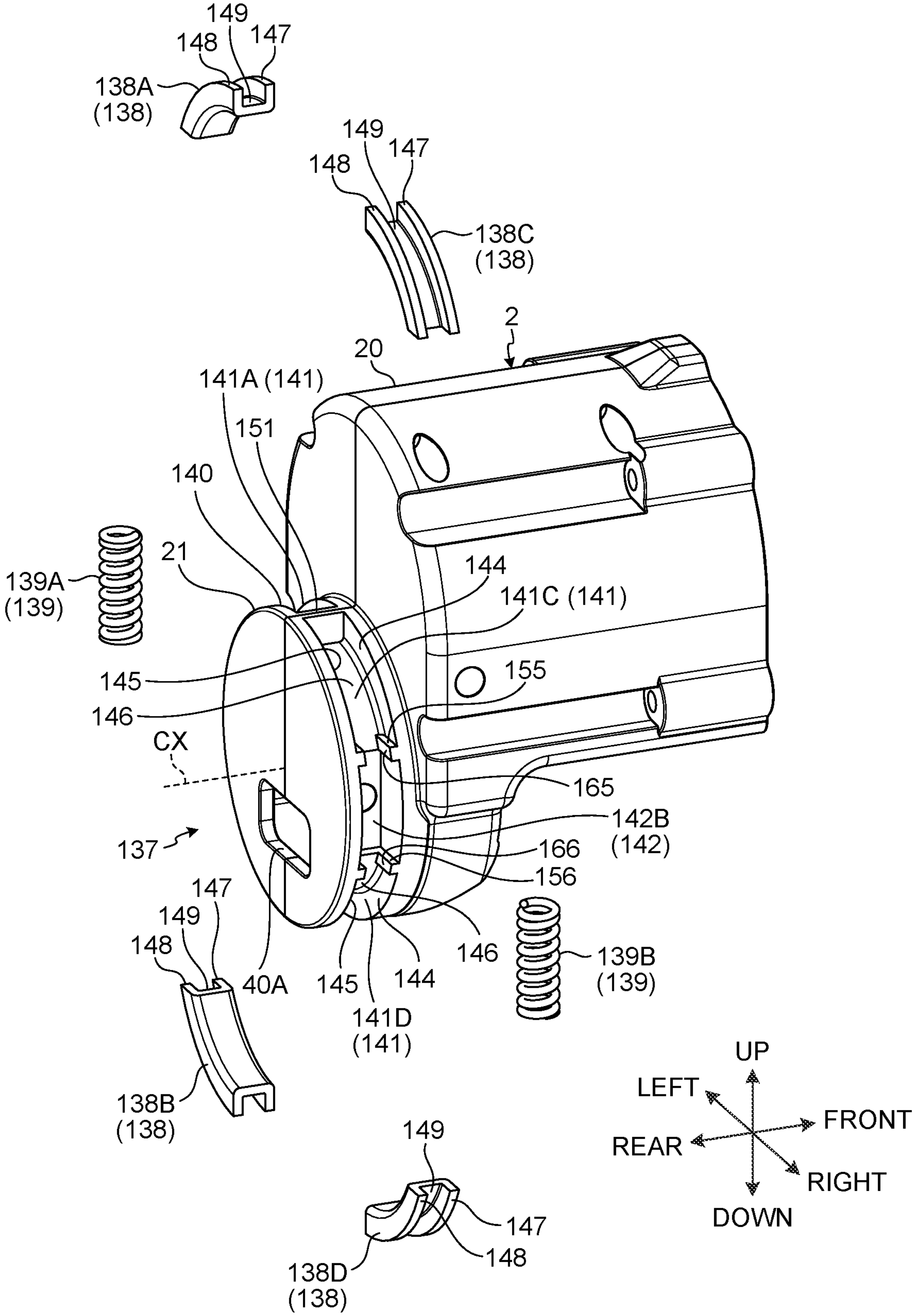
FIG. 18 is a partial, exploded, oblique view of the impact tool according to the embodiment.

FIG. 14 is a partial, cross-sectional view of the impact tool 1 according to the embodiment and corresponds to a cross-sectional auxiliary view taken along line C-C in FIG. 9. FIG. 15 is a partial, cross-sectional view of the impact tool 1 according to the embodiment and corresponds to a cross-sectional auxiliary view taken along line D-D in FIG. 14. FIG. 16 is a partial, cross-sectional view of the impact tool 1 according to the embodiment and corresponds to a drawing, viewed from above (the E direction), of a cross section taken along line E'-E' in FIG. 14. FIG. 17 is a partial, exploded, oblique view of the impact tool 1 according to the embodiment. FIG. 18 is a partial, exploded, oblique view of the impact tool 1 according to the embodiment.

As shown in FIGS. 14-18, the impact tool 1 comprises a vibration-isolating mechanism 137. The vibration-isolating mechanism 137 curtails (attenuates) the transmission of vibration of the hammer case 6 to the grip housing 3 via the main-body housing 2. Vibration will typically occur in the hammer case 6 during operation owing to at least one of: the rotation of the anvil 16 during fastening work; the impacts on the anvil 16 by the impact mechanism 15; and the load received by the anvil 16 from the work object. When vibration of the hammer case 6 is transmitted to the grip housing 3 via the main-body housing 2 and the grip housing 3 shakes, there is a possibility that the work efficiency of the fastening work will decrease, the user who grips the grip housing 3 will be caused discomfort, or the like. Owing to the transmission of the vibration of the hammer case 6 to the grip housing 3 via the main-body housing 2 being curtailed (attenuated) by the vibration-isolating mechanism 137, the occurrence of a decrease in the work efficiency of the fastening work, the occurrence of the user who grips the grip housing 3 being caused discomfort, and the like are curtailed (reduced). In addition, in the embodiment, the controller 11 is housed within the controller-housing part 28 of the grip housing 3. When the controller 11 vibrates, there is a possibility that a faulty operation of the controller 11 will occur. Owing to the transmission of the vibration of the hammer case 6 to the grip housing 3 being curtailed (attenuated) by the vibration-isolating mechanism 137, vibration of the controller 11 is curtailed (reduced).

The vibration-isolating mechanism 137 comprises vibration-isolating members 138 and vibration-isolating members 139, which are disposed between the main-body housing 2 and the grip housing 3. The vibration-isolating members 138 and the vibration-isolating members 139 each curtail (attenuate) the transmission of the vibration of the hammer case 6 to the grip housing 3 via the main-body housing 2.

As described above, the main-body housing 2 comprises the main-body part 20 and the protruding part 21, which protrudes rearward from the main-body part 20. The grip housing 3 comprises the coupling part 30, which is coupled to the protruding part 21. The vibration-isolating members 138 and the vibration-isolating members 139 are each disposed between the protruding part 21 and the coupling part 30.

It is noted that, as shown in FIGS. 14 and 15, in the protruding part 21, the left main-body housing 2L and the right main-body housing 2R are fixed to each other by a screw 190.

Each of the vibration-isolating members 138 is a first vibration-isolating member that curtails (attenuates) the transmission of vibration of the hammer case 6 in the axial direction parallel to output rotational axis BX to the grip housing 3 via the main-body housing 2. Each of the vibration-isolating members 138 is composed of rubber or another type of elastomer. In the embodiment, each of the vibration-isolating members 138 is a rubber cushion.

Each of the vibration-isolating members 139 is a second vibration-isolating member that curtails (attenuates) the transmission (propagation) of vibration of the hammer case 6 in the rotational direction centered on output rotational axis BX to the grip housing 3 via the main-body housing 2. Each of the vibration-isolating members 139 comprises a spring, such as a straight coil spring as shown in FIGS. 14, 15, 17 and 18. In the embodiment, each of the vibration-isolating members 139 is a compression spring. Preferably, two straight compression coil springs (139A, 139B) each have a straight longitudinal axis and the straight longitudinal axes extend in parallel to each other in the up-down direction.

As shown in FIGS. 17 and 18, the outer shape of the protruding part 21 substantially is a circular-column shape. The protruding part 21 comprises: an outer-circumferential surface 140, which is disposed so as to encircle virtual axis CX parallel to output rotational axis BX, and groove parts (grooves) 141, which are formed in at least portions of the outer-circumferential surface 140. The opening 40A is provided in the protruding part 21.

As shown in FIGS. 14, and 16-18, a plurality of the groove parts (grooves) 141 is provided on the outer-circumferential surface 140. In the embodiment, four of the groove parts 141 are provided on the outer-circumferential surface 140. In the explanation below, the groove part 141 that is provided to the upper left of virtual axis CX is called groove part 141A where appropriate, the groove part 141 provided to the lower left of virtual axis CX is called groove part 141B where appropriate, the groove part 141 provided to the upper right of virtual axis CX is called groove part 141C where appropriate, and the groove part 141 provided to the lower right of virtual axis CX is called groove part 141D where appropriate.

The groove parts 141 (141A, 141B, 141C, 141D) are formed such that they each extend in the circumferential direction around virtual axis CX. Within a plane orthogonal to virtual axis CX, each of the groove parts 141 is formed into an arcuate shape.

In addition, as shown in FIGS. 14, 15, 17, and 18, the protruding part 21 has recessed parts (recesses) 142, which are formed adjacent to the groove parts (grooves) 141 on the outer-circumferential surface 140. A plurality of the recessed parts 142 is provided on the outer-circumferential surface 140. In the embodiment, two of the recessed parts 142 are provided on the outer-circumferential surface 140. In the explanation below, the recessed part 142 provided leftward of virtual axis CX is called recessed part 142A where appropriate, and the recessed part 142 provided rightward of virtual axis CX is called recessed part 142B where appropriate.

The recessed parts 142 are formed between the first groove parts 141, among the plurality of groove parts 141, and the second groove parts 141, among the plurality of groove parts 141, that are adjacent to each other. In the embodiment, the recessed part 142A is provided between the groove part 141A and the groove part 141B, which is disposed adjacent to the groove part 141A. The groove part 141B is provided downward of the groove part 141A. The recessed part 142B is provided between the groove part 141C and the groove part 141D, which is disposed adjacent to the groove part 141C. The groove part 141D is provided downward of the groove part 141C.

The recessed parts 142 (142A, 142B) are formed such that they extend in the up-down direction.

The space inward (in the interior) of the recessed part 142A, the space inward of the groove part 141A, and the space inward (in the interior) of the groove part 141B are connected to each other. The space inward (in the interior) of the recessed part 142B, the space inward of the groove part 141C, and the space inward (in the interior) of the groove part 141D are connected to each other.

As shown in FIGS. 14 and 18, a partition wall 151 is provided between an upper-end portion of the groove part 141A and an upper-end portion of the groove part 141C. A partition wall 152 is provided between a lower-end portion of the groove part 141B and a lower-end portion of the groove part 141D.

A partition wall 155 is provided between a lower-end portion of the groove part 141C and an upper-end portion of the recessed part 142B. The space inward (in the interior) of the groove part 141C and the space inward (in the interior) of the recessed part 142B are connected via a notched part 165, which is provided on the partition wall 155. A partition wall 156 is provided between an upper-end portion of the groove part 141D and a lower-end portion of the recessed part 142B. The space inward (in the interior) of the groove part 141D and the space inward (in the interior) of the recessed part 142B are connected via a notched part 166, which is provided on the partition wall 156. Likewise, a partition wall 153 is provided between a lower-end portion of the groove part 141A and an upper-end portion of the recessed part 142A. The space inward (in the interior) of the groove part 141A and the space inward (in the interior) of the recessed part 142A are connected via a notched part 163, which is provided on the partition wall 153. A partition wall 154 is provided between an upper-end portion of the groove part 141B and a lower-end portion of the recessed part 142A. The space inward (in the interior) of the groove part 141B and the space inward (in the interior) of the recessed part 142A are connected via a notched part 164, which is provided on the partition wall 154.

As shown in FIGS. 14 and 17, protruding parts (first protrusions) 143 are provided on the inner surface of the coupling part 30 of the grip housing 3.

The protruding parts 143 provided on the coupling part 30 of the grip housing 3 are respectively disposed in the groove parts 141 provided on the protruding part 21 of the main-body housing 2. A plurality of the protruding parts 143 is provided such that the protruding parts 143 are respectively disposed in the groove parts 141. In the embodiment, four of the protruding parts 143 are provided on the inner surface of the coupling part 30. In the explanation below, the protruding part 143 disposed in the groove part 141A is called protruding part 143A where appropriate, the protruding part 143 disposed in the groove part 141B is called protruding part 143B where appropriate, the protruding part 143 disposed in the groove part 141C is called protruding part 143C where appropriate, and the protruding part 143 disposed in the groove part 141D is called protruding part 143D where appropriate.

The protruding parts 143 (143A, 143B, 143C, 143D) are formed such that they extend in the circumferential direction around virtual axis CX. Within a plane orthogonal to virtual axis CX, each of the protruding parts 143 is formed into an arcuate shape.

As shown in FIGS. 14, and 16-18, the vibration-isolating members 138 are respectively disposed in the groove parts 141. That is, each of the vibration-isolating members 138 is disposed in a corresponding one of the groove parts 141. In the embodiment, four of the vibration-isolating members 138 are provided. In the explanation below, the vibration-isolating member 138 disposed in the groove part 141A is called vibration-isolating member 138A where appropriate, the vibration-isolating member 138 disposed in the groove part 141B is called vibration-isolating member 138B where appropriate, the vibration-isolating member 138 disposed in the groove part 141C is called vibration-isolating member 138C where appropriate, and the vibration-isolating member 138 disposed in the groove part 141D is called vibration-isolating member 138D where appropriate.

The vibration-isolating members 138 (138A, 138B, 138C, 138D) extend in the circumferential direction around virtual axis CX. Within a plane orthogonal to virtual axis CX, each of the vibration-isolating members 138 has an arcuate shape.

As shown in FIGS. 14, 15, 17, and 18, the vibration-isolating members 139 are respectively disposed in the recessed parts 142. That is, each of the vibration-isolating members 139 is disposed in a corresponding one of the recessed parts 142. In the embodiment, two of the vibration-isolating members 139 are provided. In the explanation below, the vibration-isolating member 139 disposed in the recessed part 142A is called vibration-isolating member 139A where appropriate, and the vibration-isolating member 139 disposed in the recessed part 142B is called vibration-isolating member 139B where appropriate.

The vibration-isolating members 139 (139A, 139B) extend in the up-down direction. Each of the vibration-isolating members 139 has an upper-end portion and a lower-end portion.

The vibration-isolating members 139 are disposed in the recessed parts 142 such that the vibration-isolating members 139 expand (elongate) and contract (compress) in the rotational direction (up-down direction). The vibration-isolating members 139 deform elastically at least in the rotational direction.

Each of the inner surfaces of the groove parts 141 includes a first support surface 144, a second support surface 145, and a circumferential surface 146. The first support surfaces 144 face rearward in the axial direction of the anvil-shaft part 113. The second support surfaces 145 are disposed rearward of the first support surfaces 144. The second support surfaces 145 face forward in the axial direction of the anvil-shaft part 113. The circumferential surfaces 146 are respectively connected to radially inward end portions of the first support surfaces 144 and to radially inward end portions of the second support surfaces 145. The circumferential surfaces 146 face radially outward.

The vibration-isolating members 138 comprise: first vibration-isolating portions 147, which are supported by the first support surfaces 144; second vibration-isolating portions 148, which are supported by the second support surfaces 145; and third vibration-isolating portions 149, which are supported by the circumferential surfaces 146. The first vibration-isolating portions 147 deform elastically at least in the axial direction (front-rear direction) of the anvil-shaft part 113. The second vibration-isolating portions 148 deform elastically at least in the axial direction (front-rear direction). The first vibration-isolating portions 147 respectively make contact with the first support surfaces 144. The second vibration-isolating portions 148 respectively make contact with the second support surfaces 145. The third vibration-isolating portions 149 respectively make contact with the circumferential surfaces 146.

The first vibration-isolating portions 147 and the second vibration-isolating portions 148 are disposed spaced apart in the front-rear direction and preferably extend in parallel to each other. The second vibration-isolating portions 148 are disposed rearward of the first vibration-isolating portions 147. The first vibration-isolating portions 147 and the second vibration-isolating portions 148 respectively oppose each other across gaps.

The protruding parts 143 of the grip housing 3 are respectively disposed between the first vibration-isolating portions 147 and the second vibration-isolating portions 148. The protruding part 143A is disposed between the first vibration-isolating portion 147 and the second vibration-isolating portion 148 of the vibration-isolating member 138A. The protruding part 143B is disposed between the first vibration-isolating portion 147 and the second vibration-isolating portion 148 of the vibration-isolating member 138B. The protruding part 143C is disposed between the first vibration-isolating portion 147 and the second vibration-isolating portion 148 of the vibration-isolating member 138C. The protruding part 143D is disposed between the first vibration-isolating portion 147 and the second vibration-isolating portion 148 of the vibration-isolating member 138D.

The front surfaces of the protruding parts 143 respectively make contact with the first vibration-isolating portions 147. The rear surfaces of the protruding parts 143 respectively make contact with the second vibration-isolating portions 148. The radially inward inner surfaces of the protruding parts 143 respectively make contact with the third vibration-isolating portions 149.

In addition, at least a portion of each of the protruding parts 143 makes contact with an end portion of the corresponding vibration-isolating member 139 disposed in the corresponding recessed part 142. The end portions of the protruding parts 143 in the rotational direction make contact with the end portions of the vibration-isolating members 139 disposed in the recessed parts 142.

A lower-end portion of the protruding part 143A, which is disposed in the groove part 141A, makes contact with an upper-end portion, which is one end portion, of the vibration-isolating member 139A, which is disposed in the recessed part 142A, via the notched part 163, which is formed on the partition wall 153 at a lower-end portion of the groove part 141A. The upper-end portion of the vibration-isolating member 139A makes contact with a lower-end portion of the protruding part 143A in the state in which the upper-end portion of the vibration-isolating member 139A is inserted into the interior of the notched part 163. An upper-end portion of the protruding part 143A, which is disposed in the groove part 141A, is spaced apart from the partition wall 151 at an upper-end portion of the groove part 141A. If the grip housing 3 rotates relative to the main-body housing 2, e.g., due to vibration and/or torsion during operation of the impact tool 1, the upper-end portion of the protruding part 143A and the partition wall 151 will make contact with each other.

An upper-end portion of the protruding part 143B, which is disposed in the groove part 141B, makes contact with a lower-end portion, which is the other end portion, of the vibration-isolating member 139A, which is disposed in the recessed part 142A, via the notched part 164, which is formed on the partition wall 154 at an upper-end portion of the groove part 141B. The lower-end portion of the vibration-isolating member 139A makes contact with an upper-end portion of the protruding part 143B in the state in which the lower-end portion of the vibration-isolating member 139A is inserted into the interior of the notched part 164. A lower-end portion of the protruding part 143B, which is disposed in the groove part 141B, is spaced apart from the partition wall 152 at a lower-end portion of the groove part 141B. If the grip housing 3 rotates relative to the main-body housing 2, e.g., due to vibration and/or torsion during operation of the impact tool 1, the lower-end portion of the protruding part 143B and the partition wall 152 will make contact with each other.

The vibration-isolating member 139A is sandwiched between the lower-end portion of the protruding part 143A and the upper-end portion of the protruding part 143B.

A lower-end portion of the protruding part 143C, which is disposed in the groove part 141C, makes contact with an upper-end portion, which is one end portion, of the vibration-isolating member 139B, which is disposed in the recessed part 142B, via the notched part 165, which is formed on the partition wall 155 at a lower-end portion of the groove part 141C. The upper-end portion of the vibration-isolating member 139B makes contact with a lower-end portion of the protruding part 143C in the state in which the upper-end portion of the vibration-isolating member 139B is inserted into the interior of the notched part 165. An upper-end portion of the protruding part 143C, which is disposed in the groove part 141C, is spaced apart from the partition wall 151 at an upper-end portion of the groove part 141C. If the grip housing 3 rotates relative to the main-body housing 2, e.g., due to vibration and/or torsion during operation of the impact tool 1, the upper-end portion of the protruding part 143C and the partition wall 151 will make contact with each other.

An upper-end portion of the protruding part 143D, which is disposed in the groove part 141D, makes contact with a lower-end portion, which is the other end portion, of the vibration-isolating member 139B, which is disposed in the recessed part 142B, via the notched part 166, which is formed on the partition wall 156 at an upper-end portion of the groove part 141D. The lower-end portion of the vibration-isolating member 139B makes contact with an upper-end portion of the protruding part 143D in the state in which the lower-end portion of the vibration-isolating member 139B is inserted into the interior of the notched part 166. A lower-end portion of the protruding part 143D, which is disposed in the groove part 141D, is spaced apart from the partition wall 152 at a lower-end portion of the groove part 141D. If the grip housing 3 rotates relative to the main-body housing 2, e.g., due to vibration and/or torsion during operation of the impact tool 1, the lower-end portion of the protruding part 143D and the partition wall 152 will make contact with each other.

The vibration-isolating member 139B is sandwiched between the lower-end portion of the protruding part 143C and the upper-end portion of the protruding part 143D.

If the hammer case 6 is vibrating in the axial direction parallel to output rotational axis BX, vibration transmitted from the hammer case 6 to the grip housing 3 via the main-body housing 2 is attenuated by the elastic deformation of the first vibration-isolating portions 147, which respectively make contact with the front surfaces of the protruding parts 143, and the elastic deformation of the second vibration-isolating portions 148, which respectively make contact with the rear surfaces of the protruding parts 143. That is, owing to the elastic deformation of the vibration-isolating members 138 in the axial direction, the transmission of vibration of the hammer case 6 in the axial direction parallel to output rotational axis BX to the grip housing 3 is curtailed (reduced).

If the hammer case 6 is vibrating in the rotational direction centered on output rotational axis BX, vibration transmitted from the hammer case 6 to the grip housing 3 via the main-body housing 2 is attenuated by the elastic deformation of the vibration-isolating members 139, which respectively make contact with the end portions of the protruding parts 143 in the rotational direction. That is, owing to the elastic deformation of the vibration-isolating members 139 in the rotational direction, the transmission of vibration of the hammer case 6 in the rotational direction centered on output rotational axis BX to the grip housing 3 is curtailed (reduced).

Operation of Impact Tool

Next, the operation of the impact tool 1 will be explained. For example, when fastening work is performed on a work object, a socket used in the fastening work is mounted on a front-end portion of the anvil 16. After the socket has been mounted on the anvil 16, the user grips the side handle 7 with their left hand, grips the grip part 27 with their right hand, and manipulates the trigger lever 116 with their index finger or middle finger of their right hand such that the trigger lever 116 moves rearward. When the trigger lever 116 is manipulated (pressed) such that it moves rearward, electric power is supplied from the battery pack 63 to the motor 10, and thereby the motor 10 operates (is energized) and the light assembly 18 turns ON. In response to the operation (energization) of the motor 10, the rotor 69 and the rotor shaft 70 rotate. When the rotor shaft 70 rotates, the rotational force of the rotor shaft 70 is transmitted to the planet gears 89 via the first bevel gear 80, the second bevel gear 86, and the sun gear 88. Because the planet gears 89 mesh with the inner teeth of the internal gear 90 (which is non-rotatable relative to the housing 2), the planet gears 89 revolve around the sun gear 88 while rotating. The planet gears 89 are respectively supported in a rotatable manner by the spindle 14 via the pins 93. Owing to the revolving of the planet gears 89, the spindle 14 rotates at a rotational speed that is lower than the rotational speed of the rotor shaft 70.

While the hammer-projection parts 106 and the anvil-projection parts 114 are in contact with each other and the spindle 14 is rotating, the anvil 16 rotates together with the hammer 98 and the spindle 14. Owing to the rotation of the anvil 16, the fastening work progresses.

However, when a load of a prescribed value or more acts on the anvil 16 owing to the progression of the fastening work, rotation of the anvil 16 and the hammer 98 temporarily stops. In the state in which rotation of the hammer 98 is momentarily stopped but the spindle 14 continues to rotate relative to the anvil 16, the hammer 98 moves rearward. In response to the rearward movement of the hammer 98, the contact between the hammer-projection parts 106 and the anvil-projection parts 114 is released. Owing to the elastic force of the first coil spring 100 and the second coil spring 101, the hammer 98, which has moved rearward, moves forward while rotating. Owing to the hammer 98 moving forward while rotating, the anvil 16 is impacted in the rotational direction by the hammer 98. Thereby, the anvil 16 rotates about output rotational axis BX with high torque. Consequently, a bolt or a nut can be tightened with high torque.

If an excessively heavy load acts on the anvil-shaft part 113 during fastening work, there is a possibility that a portion of the anvil-shaft part 113 will break. In the embodiment, the breakage starting-point portion 134 is provided on the anvil-shaft part 113. Consequently, when an excessively heavy load acts on the anvil-shaft part 113, the anvil-shaft part 113 is more prone to breaking (fracturing) at the breakage starting-point portion 134 than at any another portion of the anvil-shaft part 113, as was explained above with reference to FIG. 13. Therefore, if the anvil-shaft part 113 breaks at the breakage starting-point portion 134 and the anvil-shaft part 113 forward of the breakage starting-point portion 134 moves forward relative to the hammer case 6, the first rear-side surface 127 of the first groove part 121 will be caught (blocked, impeded) by the restraining member 123. Consequently, the broken portion of the anvil-shaft part 113 forward of the breakage starting-point portion 134 is restrained (blocked, impeded) from coming off of (separating or dislodging from) the impact tool 1.

In addition or in the alternative, vibration of the hammer case 6 generated during fastening work is attenuated by the vibration-isolating mechanism 137. Thereby, the amount of vibration of the hammer case 6 transmitted to the grip housing 3 via the main-body housing 2 is curtailed (reduced). Accordingly, the occurrence of a decrease in work efficiency of the fastening work, the user who grips the grip housing 3 being caused discomfort, or the like are curtailed. Vibration of the controller 11, which is housed in the controller-housing part 28 of the grip housing 3, is also curtailed (reduced). Accordingly, the occurrence of operation faults of the controller 11 is curtailed (reduced).

Effects

According to the embodiment as explained above, the impact tool 1 comprises: the motor 10; the impact mechanism 15, which is driven by the motor 10; the anvil 16, which is impacted by the impact mechanism 15 in the rotational direction; the hammer case 6, which houses the impact mechanism 15; the main-body housing 2; and the grip housing 3. The impact mechanism 15 is rotatable about output rotational axis BX extending in the front-rear direction. The anvil 16 comprises: the anvil-shaft part (anvil shaft) 113, which is disposed forward of the impact mechanism 15; and the anvil-projection parts (anvil projection(s)) 114, which protrude radially outward from a rear-end portion of the anvil-shaft part 113. The anvil-projection parts 114 are impacted by the impact mechanism 15 in the rotational direction about output rotational axis BX. The main-body housing 2 is disposed rearward of the hammer case 6. The main-body housing 2 is fixed to the hammer case 6. At least a portion of the grip housing 3 is disposed rearward of the main-body housing 2. The grip housing 3 is coupled to the main-body housing 2 in a movable manner relative to the main-body housing 2. The impact tool 1 comprises the vibration-isolating members 138 and the vibration-isolating members 139, which are disposed between the main-body housing 2 and the grip housing 3.

According to the above-mentioned configuration, the grip housing 3 is coupled to the main-body housing 2 in a movable manner relative to the main-body housing 2. The vibration-isolating members 138 and the vibration-isolating members 139 are disposed between the main-body housing 2 and the grip housing 3. When the impact mechanism 15 impacts the anvil 16 in the rotational direction, a relatively large vibration is generated in the hammer case 6. When such vibration has been generated in the hammer case 6, the vibration-isolating members 138 and the vibration-isolating members 139 reduce the amount of vibration that is transmitted from the hammer case 6 to the grip housing 3 via the main-body housing 2 by attenuating (absorbing) such vibration.

In the embodiment, the main-body housing 2 comprises the main-body part 20 and the protruding part 21, which protrudes rearward from the main-body part 20. The grip housing 3 comprises the coupling part 30, which is coupled to the protruding part 21. The vibration-isolating members 138 and the vibration-isolating members 139 are disposed between the protruding part 21 and the coupling part 30.

According to the above-mentioned configuration, by disposing the vibration-isolating members 138 and the vibration-isolating members 139 between the protruding part 21 of the main-body housing 2 and the coupling part 30 of the grip housing 3, incorporation of the vibration-isolating members 138 and the vibration-isolating members 139 into the impact tool 1 need not lead to an enlargement of the impact tool 1 overall.

In the embodiment, the vibration-isolating members 138 are the first vibration-isolating members, which curtail the transmission of vibration of the hammer case 6 in an axial direction parallel to output rotational axis BX to the grip housing 3, i.e. in the front-rear direction.

According to the above-mentioned configuration, when, for example, a load in the axial direction acts on the anvil 16 during fastening work, and therefore vibration in the axial direction is being generated in the hammer case 6, vibration that would otherwise be transmitted from the hammer case 6 to the grip housing 3 via the main-body housing 2 is attenuated (absorbed) by the vibration-isolating members 138.

In the embodiment, each of the vibration-isolating members 138 is composed of rubber or another elastic material.

According to the above-mentioned configuration, transmission of vibration of the hammer case 6 in the axial direction to the grip housing 3 is attenuated by elastic deformation of the rubber. In addition, rattling between the protruding part 21 and the coupling part 30 is reduced.

In the embodiment, the protruding part 21 has: the outer-circumferential surface 140, which is disposed such that it encircles virtual axis CX parallel to output rotational axis BX; and the groove parts (grooves) 141, which are formed on at least a portion of the outer-circumferential surface 140 and in which the protruding parts (protrusions) 143 provided on the grip housing 3 are disposed. An inner surface of each of the groove part 141 includes: the corresponding first support surface 144, which faces rearward; and the corresponding second support surface 145, which is disposed rearward of the first support surface 144 and faces forward. The vibration-isolating members 138 comprise the first vibration-isolating portions 147, which are supported by the first support surfaces 144, and the second vibration-isolating portions 148, which are supported by the second support surfaces 145. The protruding parts 143 are disposed between the first vibration-isolating portions 147 and the second vibration-isolating portions 148.

According to the above-mentioned configuration, because the protruding parts 143 of the grip housing 3 are respectively sandwiched between the respective pairs of the first vibration-isolating portions 147 and the second vibration-isolating portions 148 in the axial direction, vibration from the hammer case 6 in the axial direction toward the grip housing 3 is attenuated by elastic deformation of the first vibration-isolating portions 147 and elastic deformation of the second vibration-isolating portions 148 in the axial direction, i.e. in the front-rear direction.

In the embodiment, the vibration-isolating members 138 respectively comprise the third vibration-isolating portions 149, which are respectively connected to respective pairs of the first vibration-isolating portions 147 and the second vibration-isolating portions 148.

According to the above-mentioned configuration, because the first vibration-isolating portion 147 and the second vibration-isolating portion 148 are integrated (joined, connected) via the third vibration-isolating portion 149 in each of the vibration-isolating members 138, work efficiency during assembly when the vibration-isolating members 138 are to be disposed in the groove parts 141 can be improved.

In the embodiment, the vibration-isolating members 139 are the second vibration-isolating members, which curtail the transmission of vibration of the hammer case 6 in the rotational direction about output rotational axis BX to the grip housing 3.

According to the above-mentioned configuration, in the situation in which, for example, during fastening work, the impact mechanism 15 has impacted the anvil 16 in the rotational direction and therefore vibration in the rotational direction has been generated in the hammer case 6, vibration transmitted from the hammer case 6 to the grip housing 3 via the main-body housing 2 is attenuated by the vibration-isolating members 139.

In the embodiment, the protruding part 21 has: the outer-circumferential surface 140, which is disposed such that it encircles virtual axis CX parallel to output rotational axis BX; the groove parts 141, which are formed on at least a portion of the outer-circumferential surface 140 and in which the protruding parts 143 provided on the grip housing 3 are disposed; and the recessed parts 142, which are formed on the outer-circumferential surface 140 adjacent to the groove parts 141. The vibration-isolating members 139 are respectively disposed in the recessed parts 142. At least a portion of each of the protruding parts 143 makes contact with (contacts, preferably directly contacts) an end portion of the corresponding vibration-isolating member 139.

According to the above-mentioned configuration, because the end portions of the protruding parts 143 of the grip housing 3 in the rotational direction respectively make contact with the end portions of the vibration-isolating members 139 in the rotational direction, transmission of vibration of the hammer case 6 in the rotational direction toward the grip housing 3 is attenuated.

In the embodiment, the groove parts (grooves) 141A-141D are provided (defined) on the outer-circumferential surface 140. The protruding parts 143A-143D are respectively disposed in the groove parts 141A-141D. The recessed part (recess) 142A is formed between the (first) groove part (groove) 141A and the (second) groove part (groove) 141B. The protruding part 143A, which is disposed in the groove part 141A, makes contact with (contacts, preferably directly contacts) an upper-end portion of the vibration-isolating member 139A, which is disposed in the recessed part 142A. The protruding part 143B, which is disposed in the groove part 141B, makes contact with (contacts, preferably directly contacts) a lower-end portion of the vibration-isolating member 139A, which is disposed in the recessed part 142A. The recessed part 142B is formed between the groove part 141C and the groove part 141D. The protruding part 143C, which is disposed in the groove part 141C, makes contact with an upper-end portion of the vibration-isolating member 139B, which is disposed in the recessed part 142B. The protruding part 143D, which is disposed in the groove part 141D, makes contact with a lower-end portion of the vibration-isolating member 139B, which is disposed in the recessed part 142B.

According to the above-mentioned configuration, the vibration-isolating member 139A is disposed such that it is sandwiched between the protruding part 143A and the protruding part 143B in the rotational (circumferential) direction. Thereby, vibration between the protruding part 143A and the protruding part 143B is attenuated by the single vibration-isolating member 139A. Likewise, the vibration-isolating member 139B is disposed such that it is sandwiched between the protruding part 143C and the protruding part 143D in the rotational direction. Thereby, vibration between the protruding part 143C and the protruding part 143D is attenuated by the single vibration-isolating member 139B. Consequently, transmission of vibration from the hammer case 6 in the rotational direction to the grip housing 3 can be reduced using a small number (e.g., two) of the vibration-isolating members 139.

In the embodiment, the vibration-isolating members 139 respectively comprise springs.

According to the above-mentioned configuration, transmission of vibration of the hammer case 6 in the rotational direction toward the grip housing 3 is reduced by elastic deformation of the springs. In addition, rattling between the protruding part 21 and the coupling part 30 can be reduced.

In the embodiment, the impact tool 1 comprises: the speed-reducing mechanism 13, which transmits rotational force of (from, generated by) the motor 10 to the impact mechanism 15; and the gear case 5, which houses at least a portion of the speed-reducing mechanism 13 and is fixed to the hammer case 6. The main-body housing 2 houses the gear case 5.

According to the above-mentioned configuration, the main-body housing 2 is fixed to the hammer case 6 and can house the gear case 5, which is fixed to the hammer case 6.

In the embodiment, the impact tool 1 comprises: the motor housing 4, which is disposed downward of the gear case 5 and houses the motor 10. The motor housing 4 is connected to the main-body housing 2.

According to the above-mentioned configuration, the main-body housing 2 is fixed to the hammer case 6 and can be connected to the motor housing 4, which houses the motor 10.

In the embodiment, the motor housing 4 is fixed to the gear case 5.

According to the above-mentioned configuration, the hammer case 6, the gear case 5, and the motor housing 4 are integrated.

In the embodiment, the motor 10 comprises the stator 68, the rotor 69, which is rotatable relative to the stator 68 about motor rotational axis MX extending in the up-down direction, and the rotor shaft 70, which is fixed to the rotor 69.

According to the above-mentioned configuration, motor rotational axis MX and output rotational axis BX are orthogonal to each other. When the motor 10 is started or stopped, the transmission of vibration in the rotational direction about motor rotational axis MX generated in the motor 10 to the grip housing 3 is attenuated.

In the embodiment, the impact tool 1 comprises: the first bevel gear 80, which is fixed to an upper-end portion of the rotor shaft 70. The speed-reducing mechanism 13 comprises the second bevel gear 86, which meshes with the first bevel gear 80, and the planetary-gear mechanism 87, which is driven based on the rotational force of the motor 10 transmitted via the second bevel gear 86.

According to the above-mentioned configuration, even though motor rotational axis MX and output rotational axis BX are orthogonal to each other, the rotational force of the motor 10 is efficiently transmitted to the planetary-gear mechanism 87 of the speed-reducing mechanism 13 by the first bevel gear 80 and the second bevel gear 86.

In the embodiment, the grip housing 3 comprises the grip part 27. The impact tool 1 comprises the trigger switch 17, which is disposed on the grip part 27 and is manipulated to operate the motor 10.

According to the above-mentioned configuration, in the state in which the user has gripped the grip part 27 with, for example, their right hand, the trigger switch 17 can be manipulated using the index finger or the middle finger of their right hand, and thereby the motor 10 can be caused to operate.

In the embodiment, the impact tool 1 comprises the controller 11, which controls the motor 10. The grip housing 3 comprises the controller-housing part 28, which houses the controller 11.

According to the above-mentioned configuration, the controller 11 is disposed in the grip housing 3. The transmission of vibration of the hammer case 6 toward the controller 11 via the main-body housing 2 is attenuated by the vibration-isolating members 138 and the vibration-isolating members 139. When vibration is transmitted to the controller 11, there is a possibility that, for example, malfunctions of the controller 11 will occur. Because the transmission of vibration to the controller 11 is attenuated, malfunctions of the controller 11 are curtailed.

In the embodiment, the grip part 27 comprises: the rear-grip part 31, which extends upward from a rear portion of the controller-housing part 28; the upper-grip part 32, which extends forward from an upper-end portion of the rear-grip part 31; and the front-grip part 33, which extends downward from a front-end portion of the upper-grip part 32.

According to the above-mentioned configuration, the grip part 27 is formed substantially in a ring shape. Thereby, even if the impact energy of the impact mechanism 15 (the fastening torque of the anvil 16) is increased, the user can handle the impact energy of the impact mechanism 15 by gripping at least a portion of the grip part 27.

Other Embodiments

In the embodiment described above, the restraining member 123 is an O-ring that is made of rubber. However, is the restraining member 123 does not have to be an O-ring and may be a ring-shaped member made of a synthetic resin (polymer), such as another type of elastomeric material, or a metal. In addition, the restraining member 123 does not have to be ring shaped and may be, for example, a snap ring.

In the embodiment described above, within a plane orthogonal to output rotational axis BX, the outer shape of the anvil-shaft part 113 at the first groove part 121 is a circular shape, and the outer shape of the anvil-shaft part 113 at the third groove part 135 is a circular shape. In addition, diameter Db of the anvil-shaft part 113 at the third groove part 135 is smaller (less) than diameter Da of the anvil-shaft part 113 at the first groove part 121. The outer shape of the anvil-shaft part 113 at the breakage starting-point portion 134 does not have to be a circular shape. The section modulus of the breakage starting-point portion 134 should be smaller (less) than the section modulus of the anvil-shaft part 113 at the first groove part 121.

In the embodiment described above, the anvil bearing 115 is a slide bearing. In addition, the second groove part 122 is formed on the inner-circumferential surface of the slide bearing. However, for example, in an alternate embodiment, the anvil bearing 115 may comprise two ball bearings disposed spaced apart in the front-rear direction (i.e. in the axial direction of the anvil-shaft part 113). The gap between the ball bearings may function as the second groove part 122.

In the embodiment described above, the vibration-isolating members 138 are made of rubber. However, the vibration-isolating members 138 may, in addition or in the alternative, comprise springs. Similarly, in the embodiment described above, the vibration-isolating members 139 are springs. However, the vibration-isolating members 139 may, in addition or in the alternative, be composed of rubber or another type of elastomeric material.

In the embodiment described above, the vibration-isolating members 138 are respectively disposed in the groove parts 141 provided in the main-body housing 2 and the vibration-isolating members 139 are respectively disposed in the recessed parts 142 provided in the main-body housing 2. In addition, the protruding parts 143 provided on the grip housing 3 come in contact with the vibration-isolating members 138 and the vibration-isolating members 139, which are supported (held) by the main-body housing 2. However, in an alternate embodiment, the vibration-isolating members 138 and the vibration-isolating members 139 may be supported (held) by the grip housing 3, and protruding parts provided on the main-body housing 2 may come in contact with the vibration-isolating members 138 and the vibration-isolating members 139, which are supported (held) by the grip housing 3.

In the embodiment described above, the vibration-isolating mechanism 137 comprises the vibration-isolating members 138, which curtail (attenuate) the transmission of vibration of the hammer case 6 in the axial direction parallel to output rotational axis BX to the grip housing 3, and the vibration-isolating members 139, which curtail (attenuate) the transmission of vibration of the hammer case 6 in the rotational direction about output rotational axis BX to the grip housing 3. However, in an alternate embodiment, the vibration-isolating mechanism 137 may comprise the vibration-isolating members 138 but not the vibration-isolating members 139. In addition or in the alternative, the vibration-isolating mechanism 137 may comprise the vibration-isolating members 139 but not the vibration-isolating members 138.

In the embodiment described above, the impact tool 1 is an impact wrench. However, the present teachings may also be used, e.g., in an impact driver. The anvil of an impact driver has an insertion hole, into which a tool accessory is inserted, and a chuck mechanism, which chucks the tool accessory.

In the embodiment described above, the battery pack 63 serves as the power supply of the impact tool 1 and is mounted on the battery-mounting part 9. In the alternative, a commercial power supply (AC power supply) may instead be used as the power supply of the impact tool 1.

In the embodiment described above, the motor 10 is an inner-rotor-type brushless motor. However, the motor 10 may instead be an outer-rotor type or may be a brushed motor.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved impact tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Impact tool
2 Main-body housing
2L Left main-body housing
2R Right main-body housing
3 Grip housing
3L Left grip housing
3R Right grip housing
4 Motor housing
5 Gear case
6 Hammer case
7 Side handle
8 Bumper
9 Battery-mounting part
10 Motor
11 Controller
12 Fan
13 Speed-reducing mechanism
14 Spindle
15 Impact mechanism
16 Anvil
17 Trigger switch
18 Light assembly
19 Screw
20 Main-body part
21 Protruding part
22 Gear-case housing part
23 Motor-housing connection part
24 Tube part
25 Rear-wall part
26 Screw
27 Grip part
28 Controller-housing part
29 Battery-connection part
30 Coupling part
31 Rear-grip part
32 Upper-grip part
33 Front-grip part
34 Tube part
35 Lower-wall part
36 Opening
37 Opening
38 Opening
39 Opening
40A Opening
40B Opening
41 Opening
42 Opening
43 Opening
44 Bearing cover
45 Screw
46 First tube part
47 Second tube part
48 Opening
49 Opening
50 Screw
51 Screw boss
52 Screw boss
53 Screw
54 Screw boss
55 Handle part
56 Base part
57 First base part
58 Second base part
59 Hinge
60 Tightening mechanism
61 Screw
62 Dial part
63 Battery pack
64 Terminal
65 Terminal holder
66 Spring
67 Cushioning member
68 Stator
69 Rotor
70 Rotor shaft
71 Stator core
72 Insulator
73 Coil
74 Busbar unit
75 Rotor core
76 Rotor magnet
77 Sensor board
78 Rotor bearing
79 Rotor bearing
80 First bevel gear
81 Controller case
82 Air-intake port
83 Air-exhaust port
84 Air-intake port
85 Baffle plate
86 Second bevel gear
87 Planetary-gear mechanism
88 Sun gear
89 Planet gear
90 Internal gear
91 Gear bearing
92 Gear bearing
93 Pin
94 Flange part
95 Spindle-shaft part
96 Protruding part
97 Spindle bearing
98 Hammer
99 Ball
100 First coil spring
101 Second coil spring
102 Third coil spring
103 First washer
104 Second washer
105 Hammer body
106 Hammer-projection part
107 Recessed part
108 Hole
109 Ball
110 Spindle groove
111 Hammer groove
112 Anvil-recessed part
113 Anvil-shaft part
114 Anvil-projection part

115 Anvil bearing
116 Trigger lever
117 Switch main body
118 Circuit board
119 Light-emitting device
120 Light cover
121 First groove part
122 Second groove part
123 Restraining member
124 First portion
125 Second portion
126 First front-side surface
127 First rear-side surface
128 First circumferential surface
129 Second front-side surface
130 Second rear-side surface
131 Second circumferential surface
132 Bearing-support surface
133 Sealing member
134 Breakage starting-point portion
135 Third groove part
136 Large-diameter part
137 Vibration-isolating mechanism
138 Vibration-isolating member (first vibration-isolating member)
138A Vibration-isolating member
138B Vibration-isolating member
138C Vibration-isolating member
138D Vibration-isolating member
139 Vibration-isolating member (second vibration-isolating member)
139A Vibration-isolating member
139B Vibration-isolating member
140 Outer-circumferential surface
141 Groove part
141A Groove part
141B Groove part
141C Groove part
141D Groove part
142 Recessed part
142A Recessed part
142B Recessed part
143 Protruding part
143A Protruding part
143B Protruding part
143C Protruding part
143D Protruding part
144 First support surface
145 Second support surface
146 Circumferential surface
147 First vibration-isolating portion
148 Second vibration-isolating portion
149 Third vibration-isolating portion
151 Partition wall
152 Partition wall
153 Partition wall
154 Partition wall
155 Partition wall
156 Partition wall
163 Notched part
164 Notched part
165 Notched part
166 Notched part
181 Ring spring
190 Screw
460 Cover
BX Output rotational axis
CX Virtual axis
MX Motor rotational axis
Da Diameter
Db Diameter

The invention claimed is:

1. An impact tool comprising:

a motor;

an impact mechanism configured to be driven by the motor and thereby rotated about an output rotational axis extending in a front-rear direction;

an anvil having an anvil shaft disposed forward of the impact mechanism in the front-rear direction; and at least one anvil projection that protrudes radially outward from a rear-end portion of the anvil shaft and is configured to be impacted by the impact mechanism in a rotational direction to be driven about the output rotational axis;

a hammer case, which houses the impact mechanism;

a main-body housing disposed rearward of the hammer case in the front-rear direction and fixed to the hammer case;

a grip housing having at least a portion disposed rearward of the main-body housing in the front-rear direction, the grip housing being coupled to the main-body housing so as to be movable relative to the main-body housing; and at least one second vibration-isolating member disposed between the main-body housing and the grip housing and configured to attenuate vibration in the rotational direction that is generated in the hammer case and transmitted to the grip housing.

2. The impact tool according to claim 1, wherein:

the main-body housing comprises a protruding part, which protrudes rearward from a main-body part in the front-rear direction;

the grip housing comprises a coupling part, which is coupled to the protruding part; and the at least one second vibration-isolating member is disposed between the protruding part and the coupling part.

3. The impact tool according to claim 1, further comprising:

at least one first vibration-isolating member disposed between the main-body housing and the grip housing and configured to attenuate vibration in an axial direction that is parallel to the output rotational axis, the vibration being generated in the hammer case and transmitted from the hammer case to the grip housing.

4. The impact tool according to claim 3, wherein the at least one first vibration-isolating member is composed of rubber.

5. The impact tool according to claim 3, wherein:

the main-body housing comprises a protruding part, which protrudes rearward from a main-body part in the front-rear direction;

the protruding part has: an outer-circumferential surface, which encircles a virtual axis parallel to the output rotational axis;

a first groove is defined on at least a portion of the outer-circumferential surface of the protruding part;

a first protrusion extends radially inwardly from the grip housing and is disposed in the first groove;

an inner surface of the first groove includes: a first support surface, which faces rearward in the front-rear direction; and a second support surface disposed rearward of the first support surface in the front-rear direction and facing forward in the front-rear direction;

the at least one first vibration-isolating member comprises a first vibration-isolating portion supported by the first support surface, and a second vibration-isolating portion is supported by the second support surface; and the first protrusion is disposed between the first vibration-isolating portion and the second vibration-isolating portion.

6. The impact tool according to claim 5, wherein the at least one first vibration-isolating member comprises a third vibration-isolating portion connecting the first vibration-isolating portion to the second vibration-isolating portion.

7. The impact tool according to claim 5, wherein:

the protruding part further has a first recess defined on the outer-circumferential surface adjacent to first groove;

the at least one second vibration-isolating member is disposed in the first recess; and at least a portion of the first protrusion contacts an end portion of the at least one second vibration-isolating member.

8. The impact tool according to claim 7, wherein:

a second groove is defined on the outer-circumferential surface;

an inner surface of the second groove includes: a first support surface, which faces rearward in the front-rear direction; and a second support surface disposed rearward of the first support surface in the front-rear direction and facing forward in the front-rear direction;

a second protrusion extends radially inwardly from the grip housing and is disposed in the second groove;

the first recess is defined between the first groove and the second groove;

the first protrusion disposed within the first groove contacts a first end portion of the at least one second vibration-isolating member; and the second protrusion disposed within the second groove contacts a second end portion of the at least one second vibration-isolating member.

9. The impact tool according to claim 3, comprising:

a speed-reducing mechanism configured to transmit rotational force from the motor to the impact mechanism; and a gear case, which houses at least a portion of the speed-reducing mechanism and is fixed to the hammer case;

wherein the main-body housing houses the gear case.

10. The impact tool according to claim 9, comprising:

a motor housing disposed downward of the gear case in an up-down direction perpendicular to the front-rear direction and houses the motor;

wherein the motor housing is connected to the main-body housing.

11. The impact tool according to claim 10, wherein the motor housing is fixed to the gear case.

12. The impact tool according to claim 10, wherein the motor comprises a stator, a rotor configured to rotate relative to the stator about a motor rotational axis extending in the up-down direction, and a rotor shaft, which is fixed to the rotor.

13. The impact tool according to claim 1, wherein:

the main-body housing comprises a protruding part, which protrudes rearward from a main-body part in the front-rear direction;

the protruding part has: an outer-circumferential surface, which encircles a virtual axis that is parallel to the output rotational axis;

a first groove is defined on at least a portion of the outer-circumferential surface;

at least one protrusion extends radially inwardly from the grip housing and is disposed in the first groove; and a first recess is defined on the outer-circumferential surface adjacent to the first groove;

the at least one second vibration-isolating member is disposed in the first recess; and at least a portion of the protrusion contacts an end portion of the at least one second vibration-isolating member.

14. The impact tool according to claim 13, wherein:

a second groove is defined on the outer-circumferential surface;

an inner surface of the second groove includes: a first support surface, which faces rearward in the front-rear direction; and a second support surface disposed rearward of the first support surface in the front-rear direction and facing forward in the front-rear direction;

a second protrusion extends radially inwardly from the grip housing and is disposed in the second groove;

the first recess is defined between the first groove and the second groove;

the first protrusion disposed within the first groove contacts a first end portion of the at least one second vibration-isolating member; and the second protrusion disposed within the second groove contacts a second end portion of the at least one second vibration-isolating member.

15. The impact tool according to claim 1, wherein the at least one second vibration-isolating member comprises a straight coil spring.

16. An impact tool comprising:

a motor;

an impact mechanism configured to be driven by the motor and thereby rotated about an output rotational axis extending in a front-rear direction;

an anvil having an anvil shaft disposed forward of the impact mechanism in the front-rear direction; and at least one anvil projection that protrudes radially outward from a rear-end portion of the anvil shaft and is configured to be impacted by the impact mechanism in a rotational direction to be driven about the output rotational axis;

a hammer case, which houses the impact mechanism;

a main-body housing disposed rearward of the hammer case in the front-rear direction and fixed to the hammer case;

a grip housing having at least a portion disposed rearward of the main-body housing in the front-rear direction, the grip housing being coupled to the main-body housing so as to be movable relative to the main-body housing;

a controller housed in the grip housing and configured to control the motor;

at least one vibration-isolating member disposed between the main-body housing and the grip housing;

a battery pack mounted on the grip housing so as to be movable with the grip housing relative to the main-body housing, the battery pack supplying electric power to the motor and controller; and an air-intake port formed in the grip housing and configured to draw in air for cooling the controller.

17. An impact tool comprising:

a motor;

an impact mechanism configured to be driven by the motor and thereby rotated about an output rotational axis extending in a front-rear direction;

an anvil having an anvil shaft disposed forward of the impact mechanism in the front-rear direction; and at least one anvil projection that protrudes radially outward from a rear-end portion of the anvil shaft and is configured to be impacted by the impact mechanism in a rotational direction to be driven about the output rotational axis;

a hammer case, which houses the impact mechanism;

a main-body housing disposed rearward of the hammer case in the front-rear direction and fixed to the hammer case;

a grip housing having at least a portion disposed rearward of the main-body housing in the front-rear direction, the grip housing being coupled to the main-body housing so as to be movable relative to the main-body housing; and at least a first straight coil spring disposed between the main-body housing and the grip housing and configured to attenuate vibration generated in the hammer case and propagating in the rotational direction about the output rotational axis.

18. The impact tool according to claim 17, wherein the first straight coil spring has a straight longitudinal axis that extends in an up-down direction that is perpendicular to the front-rear direction and perpendicular to the output rotational axis.

19. The impact tool according to claim 18, further comprising:

a second straight coil spring disposed between the main-body housing and the grip housing and configured to attenuate vibration in the rotational direction about the output rotational axis transmitted from the hammer case to the grip housing;

wherein a straight longitudinal axis of the second straight coil spring extends in parallel to the straight longitudinal axis of the first straight coil spring.

20. The impact tool according to claim 19, wherein the first and second straight coil springs are each compression springs.

* * * * *